United States Patent [19]
Itoh et al.

[11] Patent Number: 5,692,115
[45] Date of Patent: Nov. 25, 1997

[54] METHOD OF GENERATING AN IMAGE AND AN APPARATUS FOR CARRYING OUT SUCH A METHOD

[75] Inventors: Kumiko Itoh, Mito; Yasumasa Kawashima, Hitachi; Tomotoshi Ishida, Katsuta; Naoyuki Honda, Hitachi, all of Japan

[73] Assignee: Hitachi, Ltd., Tokyo, Japan

[21] Appl. No.: 727,760

[22] Filed: Oct. 8, 1996

Related U.S. Application Data

[63] Continuation of Ser. No. 220,250, Mar. 30, 1994, abandoned.

[30] Foreign Application Priority Data

Apr. 2, 1993 [JP] Japan .................................. 5-077056

[51] Int. Cl.$^6$ ...................................................... G06F 17/50
[52] U.S. Cl. ............................................................. 395/127
[58] Field of Search ........................................ 395/120, 127, 395/130, 132

[56] References Cited

U.S. PATENT DOCUMENTS

| | | | |
|---|---|---|---|
| 4,855,939 | 8/1989 | Fitzgerald, Jr. et al. | 364/522 |
| 5,289,574 | 2/1994 | Sawyer | 395/157 |
| 5,297,241 | 3/1994 | Hirr, Jr. et al. | 395/127 |
| 5,303,337 | 4/1994 | Ishida | 395/119 |
| 5,430,837 | 7/1995 | Matsuo | 395/155 X |

FOREIGN PATENT DOCUMENTS

| | | |
|---|---|---|
| 4-21079 | of 1992 | Japan . |
| A 2 191 070 | 2/1987 | United Kingdom . |

OTHER PUBLICATIONS

Buying Smart Software, Computer–Aided Engineering, v9, n7, p.CC24(7), Jul. 1990.

Izuchukwu, Artificial Intelligence Can Reduce Product Cost by Optimizing Design Decision (Part II), Industrial Engineering, v23, n8, p.42(5), Aug. 1991.

Safier, Parsing Features in Solid Goemetric Models, Proceedings of the 9th European Conference on Artifical Intelligence, pp. 566–572, Aug. 1990.

Using Auto CAD, Third Edition; by James E. Fuller; 1989; Chp 15.

"Method of 3D Model Reconstruction from Multi-Views Line Drawings", Cheng et al, Transactions of the Institute of Electronics, Information and Comm. Engineers E73 (1990) Jun., No. 6, Tokyo, JP, pp. 995–1003.

*Primary Examiner*—Heather R. Herndon
*Assistant Examiner*—Cliff N. Vo
*Attorney, Agent, or Firm*—Antonelli, Terry, Stout, & Kraus, LLP

[57] ABSTRACT

In order to generate a two-dimensional image of an object, three-dimensional model data is used. Drawing rules are stored which correspond to features of the object. Each drawing rule corresponds to a two-dimensional representation of the corresponding feature when that feature is viewed from a particular viewing direction. The drawing rule corresponds, in each case, to a predetermined visual presentation or appearance of the feature from the corresponding viewing direction. The user then selects the viewing direction and the two-dimensional image is generated using the model data and the appropriate drawing rule or rules. In this way, a feature of the object may be shown in the two-dimensional image with a visual presentation or appearance which is appropriate even if the visual presentation or appearance does not result from the model data. The feature may then be shown in a way which corresponds to the purpose to which the two-dimensional image is to be put.

17 Claims, 28 Drawing Sheets

FIG. 9

| Line N° | Description | Interpretation of drawing rule |
|---|---|---|
| 1 | Drawing rule, for design, screw hole, top view. | This is a drawing rule of the top view of a screw hole for design. |
| 2 | Param: d = screw hole diameter, (px, py) = proj (point on axis). | d <=> screw hole diameter, (px,py) <=> point of screw hole on axis which is subjected to coordinate transformation. |
| 3 | Scirc (px, py) d | A circle with a center point of (px,py) and a diameter of d is drawn. |
| 4 | Scirc (px, py) d + 0.2 | A circle with a center point of (px,py) and a diameter of d + 0.2 is drawn |
| 5 | Sline (px − 1.1*d, py), (px + 1.1*d, py); 0: | A dotted line is drawn between the points (px−1.1*d, py) and (px+1.1*d, py). |
| 6 | Sline (px, py − 1.1*d), (px, py + 1.1*d); 0: | A dashed line is drawn between the points (px, py−1.1*d) and (px, py+1.1*d). |

FIG.12(a)
Execution result of 3rd line
FIG.12(b)
Execution result of 4th line
FIG.12(c)
Execution result of 5th line
FIG.12(d)
Execution result of 6th line
FIG.13(a)
Execution result of up to 3rd line
FIG.13(b)
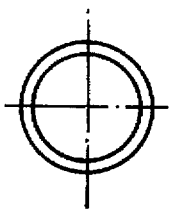
Execution result of up to 4th line
FIG.13(c)
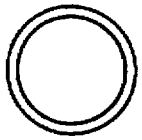
Execution result of up to 5th line
FIG.13(d)
Execution result of up to 6th line

FIG.17(e)

```
Chamfered through hole; Detailed drawing; Front view
$param d= diameter; cl= chamfering
if cl/d<1/10
then cl=5; cl=2   (Both the diameter and the chamfering
                   are drawn with the quantities
                   independant of their actual lengths)
$text "detailed drawing
```

FIG.18(c)

```
"Rule bl"; Block; Plan view;
$param d=depth; h=height; w=width
if h>"length of image" or w>"width of image"
then "reduced graphic mode"
```

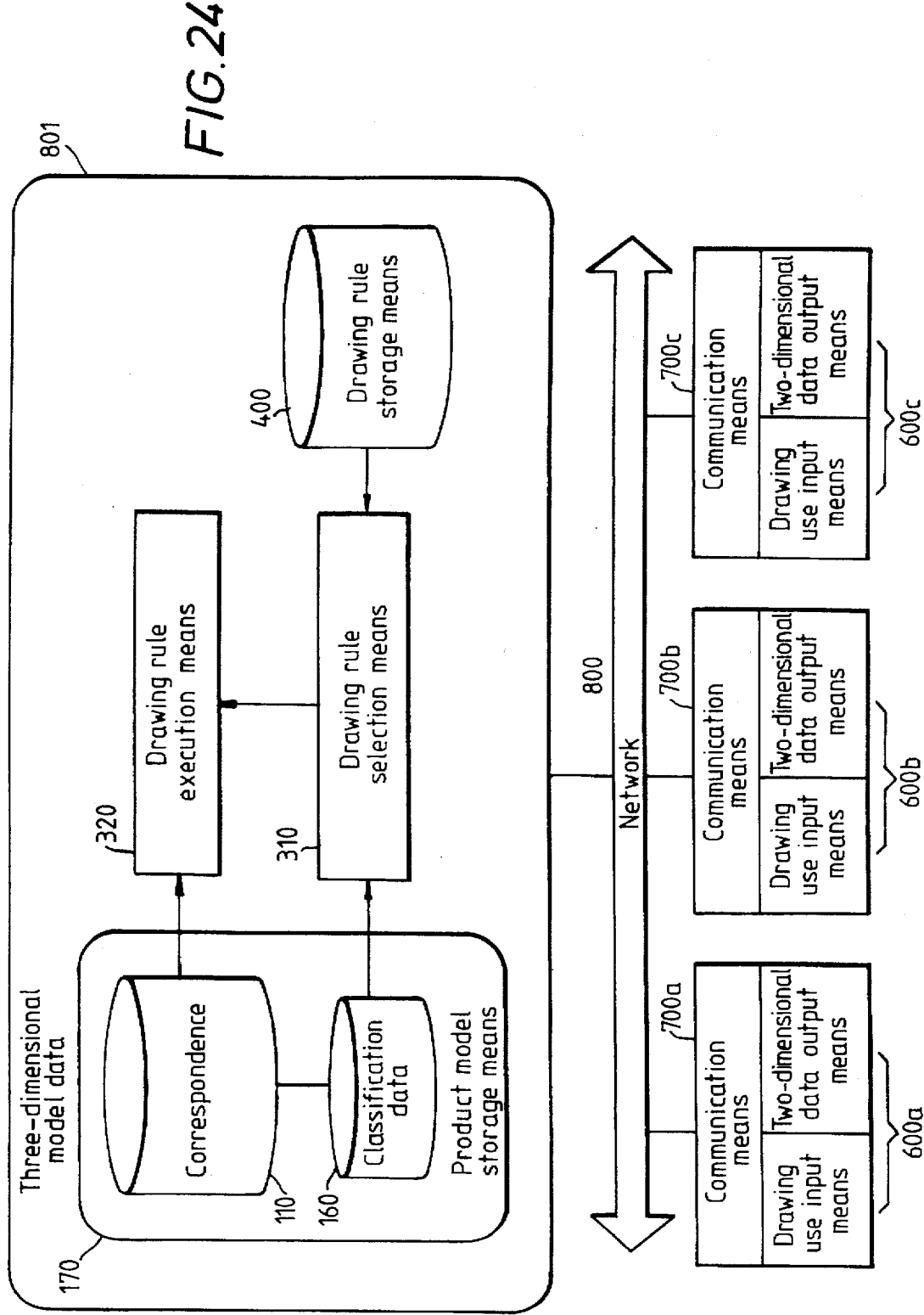

METHOD OF GENERATING AN IMAGE AND AN APPARATUS FOR CARRYING OUT SUCH A METHOD

This application is a continuation of application Ser. No. 08/220,250, filed on Mar. 30, 1994, now abandoned.

BACKGROUND OF THE INVENTION

The present invention relates to a method of generating an image of an object. It is particularly concerned with generating a two-dimensional image of an object from model data representing a three-dimensional image of the object. The present invention also relates to an apparatus for carrying out such a method.

It is well-known in computer-aided design (CAD), computer-aided management (CAM) or computer-aided engineering (CAE) to generate an image on a computer screen which appears as a three-dimensional image of an object. That image is generated from model data, and it is conventional for the model data to represent a plurality of features of the object, so that the image of the object is built-up by combining the necessary features.

In general, such features are referred to as "form features" which is a term in the art used to identify a standard component of a three-dimensional model, such as a block, hole, etc. The term "form feature" is well-known, and is used, for example, in the article entitled "Assessment of Features Technology" by J J Shah in Computer Aided Design, Vol 23, No. 5, June 1991, the article entitled "Functional Requirements and Conceptual Design of the Feature—Based Modeling System" by J J Shah and Mary T Toger in Computer Aided Engineering Journal, February 1988, and the article entitled "Designing with Features: The Origin of Features" by J J Cunningham and J R Dixon in Proc. ASME Computers in Engineering Conference (July/August 1988). However, in addition to form features, other features of the image may also be stored as model data, such as data representing the surface finishing of the object. The term "feature" in this specification is therefore used to include all these components of the image.

In order to generate a hard copy of an object, it is necessary to transform the three-dimensional image thereof into a two-dimensional image. Therefore, it is known to provide an arrangement in which the user of a CAD, CAM, or CAE system can select one viewing direction, and then the system generates a two-dimensional image of the object when viewed in that direction. That two-dimensional image is derived directly from the three-dimensional image, using the model data, and therefore exactly the same formation is presented in the three-dimensional image. Thus, for example, the three-dimensional CAD system shown in, for example the "HICAD/DESIGN/W Function Addition 205 G-3 625 of HITACHI 2050G Series Manual" is a system in which an image of an object (called a projection drawing) is obtained from three-dimensional model data, by transforming the three-dimensional image corresponding to the model data on the basis of a specified viewing direction. Contour data derived from the three-dimensional model data is obtained, and the three-dimensional model data is multiplied by a projection conversion matrix so as to calculate corresponding two-dimensional data. The projection drawings then are obtained by connecting the resulting data using line segments. This means that the projection drawing is a contour image of the three-dimensional model data and contains no other information.

JP-A-4-21079 also shows an arrangement in which a two-dimensional image is obtained from three-dimensional model data, by suitable transformation. Furthermore U.S. Pat. No. 4,855,939 discloses an arrangement in which additional data is added to the model data, to show information related to the object, such as dimensions. The existence of that additional data may simplify the transformation of the three-dimensional data into a two-dimensional image.

SUMMARY OF THE PRESENT INVENTION

In normal design and engineering practice, it is usual for products to be made from production drawings, and for those production drawings themselves to be produced from design drawings. Such production and/or design drawings carry information which is useful in the manufacture of the product. For example, if a product is to contain a threaded hole for a screw (hereinafter screw hole), it is necessary for the manufacturing and/or design drawing to indicate the purpose of the hole, to distinguish it from a non-threaded hole. In practice, there are relatively standard conventions for illustrating the appearance of various different components within a product.

Hence, when model data representing a three-dimensional image is transformed into a two-dimensional image, such representations of the features of the image do not appear. The three-dimensional model data will not contain the relevant information. If the relevant information were to be added to the model data, it would then appear in the three-dimensional image itself, making that image unnecessarily complex.

Hence, it is necessary for the user to carry out additional work on the two-dimensional image, generated from model data representing a three-dimensional image, to add lines representing the conventional visual appearances of the features to the various features of the object, to enable the image of the object to be used as a product drawing for production and/or design.

To avoid this manual step, the present invention therefore proposes that drawing rules be stored, for a feature of an object. Each design rule then corresponds to a predetermined visual appearance or presentation of the feature (for example, the conventional representation of that feature in production drawings) when the feature is viewed from a predetermined viewing direction. Then, the drawing rule is used in conjunction with the model data to generate a complete two-dimensional image.

Thus, with the present invention, the user may directly and automatically transform a three-dimensional image into a two-dimensional image, with the features of the two-dimensional image being illustrated in the normal way for production and/or design drawings. It is not necessary for the user to add conventional symbols manually. For each feature of the object, there will normally be a plurality of drawing rules. Usually, there will be a drawing rule for each angle at which the object can be viewed (such as a drawing rule corresponding to a top view, bottom view, right-side view, etc.). In practice, for some features, the appearance of the feature may be the same from more than one viewing direction, so that a more limited number of drawing rules will be needed. The drawing rules normally represent the visual appearance of the feature, from the appropriate viewing direction, but may contain other information, such as numerical data or graphical symbols, where such data or symbol is conventionally or desirably associated with the feature when viewed from a particular viewing direction. Thus, for example, it is conventional for the center of a hole to be indicated by crossed lines, when the hole is viewed axially. Hence, the drawing rule representing that axial view will contain such crossed lines, even through such crossed lines will not, in fact, form part of the visual appearance of the hole itself. Thus, the drawing rules each represent a predetermined visual presentation of the corresponding feature.

Since it is possible for features of a three-dimensional image to be displayed with different sizes, some of the drawing rules may contain at least one variable parameter, with that parameter then being varied appropriately when the drawing rule is selected. For example, drawing rules associated with a hole will vary depending on the length and diameter of such a hole. Preferably, the present invention permits such variable parameters of the drawing rules to be varied on the basis of the model data.

When, conventional production and/or design drawings are produced a specific feature may be illustrated in different ways, depending on the purpose to which the drawing is to be put. For example, in a design drawing, a hole may be represented pictorially with an appearance corresponding generally to the actual appearance of the hole in the object. In a manufacturing drawing, however, it may be necessary only to show the center line of the hole, with information being displayed denoting, e.g. an appropriate hole-drilling tool. In accordance with the present invention, therefore, the design rules may be divided into a plurality of groups, with each group representing a different visual presentation, and a different way of representing features in the final two-dimensional image. The user then selects the appropriate group of drawing rules, for example by indicating the use to which the final image is to be put.

In the development of the present invention, alteration of the drawing rules is possible. This may be achieved directly by a user by modifying or deleting existing rules, and/or by inputting new drawing rules. Furthermore, it is possible for editing of the drawing rules to occur automatically if the model data representing a feature of the three-dimensional image is itself edited.

Normally, when a two-dimensional image is generated, the drawing rules will be used immediately to provide an appropriate visual presentation or appearance of the feature. However, there are situations where this is inappropriate. For example, some features, or some parts of a feature, may be so small that the relevant information cannot be seen when an image of the whole object is generated. Therefore, the present invention also provides an arrangement in which a part of the image can be selected, and then the drawing rules used to produce an appropriate visual representation of the feature or features of that part of the image. Hence, an initial two-dimensional image may be generated, which does not make use of the drawing rules, and then a further two-dimensional image may be generated which does make use of the drawing rules.

In a further development of the present invention, a plurality of input/output units (I/O units) are connected to at least one common storage unit. The connection is effected by use of a suitable communication means, e.g. a network. The common storage unit stores the model data and the drawing rules, and each I/O unit can then permit a corresponding user to select an appropriate viewing angle, etc. This enables the I/O units to display different views of the object. Furthermore, if the design rules are divided into a plurality of groups, as discussed above, each group representing a different visual presentation or way of presenting features in the final image, then different users at different I/O units may select different groups of the design rules, so that different images may be generated at the I/O units in dependence on the way each user wants features of the object to be presented.

Although the above discussion of the present invention considers the invention from a functional viewpoint, and thus concentrates primarily on the method aspect of the present invention, it should be noted that another aspect of the present invention relates to an apparatus for carrying out such a method, in which appropriate means are provided for carrying out the functions discussed above.

BRIEF DESCRIPTION OF THE DRAWINGS

Embodiments of the present invention will now be described in detail, by way of example, with reference to the accompanying drawings, in which:

FIG. 9 is a table showing an example of the contents of a drawing rule file in the drawing rule storage means of the embodiment of FIG. 1;

FIG. 10 is a table illustrating the content of a parameter setting unit in the drawing rule execution means of the embodiment of FIG. 1;

FIGS. 12(a) to 12(d) illustrate the action of the two-dimensional data editing unit shown in FIG. 11;

FIGS. 13(a) to 13(d) illustrate the effect on the two-dimensional image of the two-dimensional data editing unit;

FIGS. 17(a) to 17(e) respectively show another example of screens that may be generated by the embodiment of FIG. 1 and a drawing rule used in the generation of such screens;

FIGS. 18(a) to 18(c) respectively show another example of screens that may be produced by the embodiment of FIG. 1, together with a drawing rule for generating such screens;

FIG. 24 is a schematic block diagram of another embodiment of the present invention.

DETAILED DESCRIPTION

Figure 1:
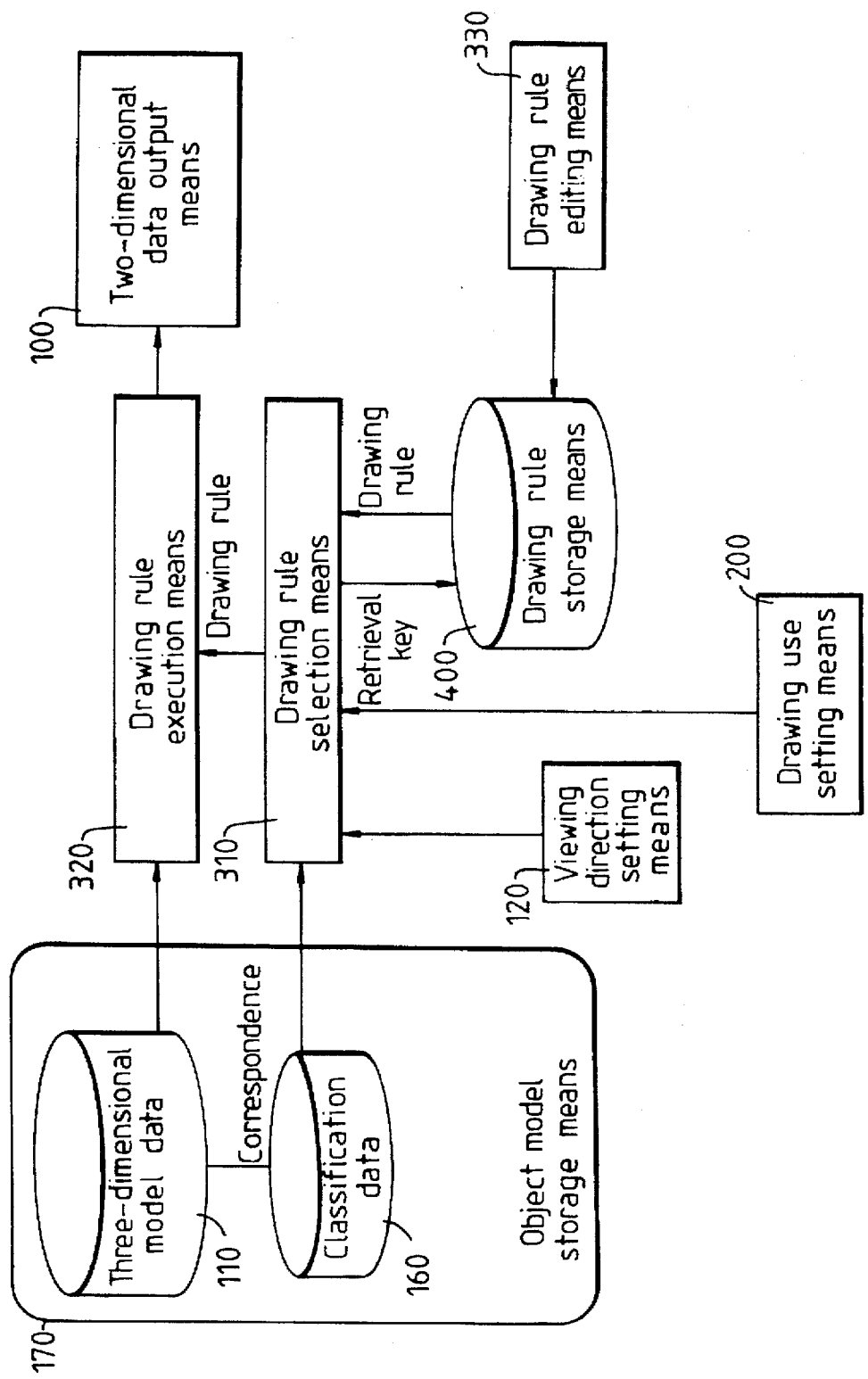
FIG. 1 is a schematic block diagram of a first embodiment of the present invention.

FIG. 1 shows the basic configuration of a drawing apparatus forming a first embodiment of the present invention. In FIG. 1, a drawing apparatus has an object (product) model storage means 170, a viewing direction setting means 120, a drawing rule storage means 400, a drawing rule selection means 310, a drawing rule execution means 320, and a two-dimensional data output means 100.

The object model storage means 170 stores three-dimensional model data representing an object and also stores feature classification data for specifying features of this three-dimensional model data. As shown in FIG. 1, the object model storage means 170 includes a three-dimensional model data storage means 110 in which three-dimensional model data of an object is stored and a feature classification data storage means 160 in which feature classification data is stored. The viewing direction setting means 120 is used by a user to select a viewing direction in which the three-dimensional model of the object is to be viewed, and the direction setting means then generates appropriate data indicating the selected viewing direction.

The drawing rule storage means 400 stores drawing rule data which form the drawing procedure for generating two-dimensional data from the three-dimensional model data, for each feature and in each viewing direction. The drawing rule selection means 310 selects the relevant drawing rule from the drawing rule storage means 400 on the basis of the data specifying the viewing direction which is input by the viewing direction setting means 120 and the feature classification data corresponding to the three-dimensional model data which is read from the object model storage means 170. The drawing rule execution means 320 then generates two-dimensional data consisting of two-dimensional characters and graphics according to the drawing rule procedure which is selected by the drawing rule selection means 310. Finally, the two-dimensional data output means 100 outputs two-dimensional data which is processed by the drawing rule execution means 320 to generate an image.

Figure 2:
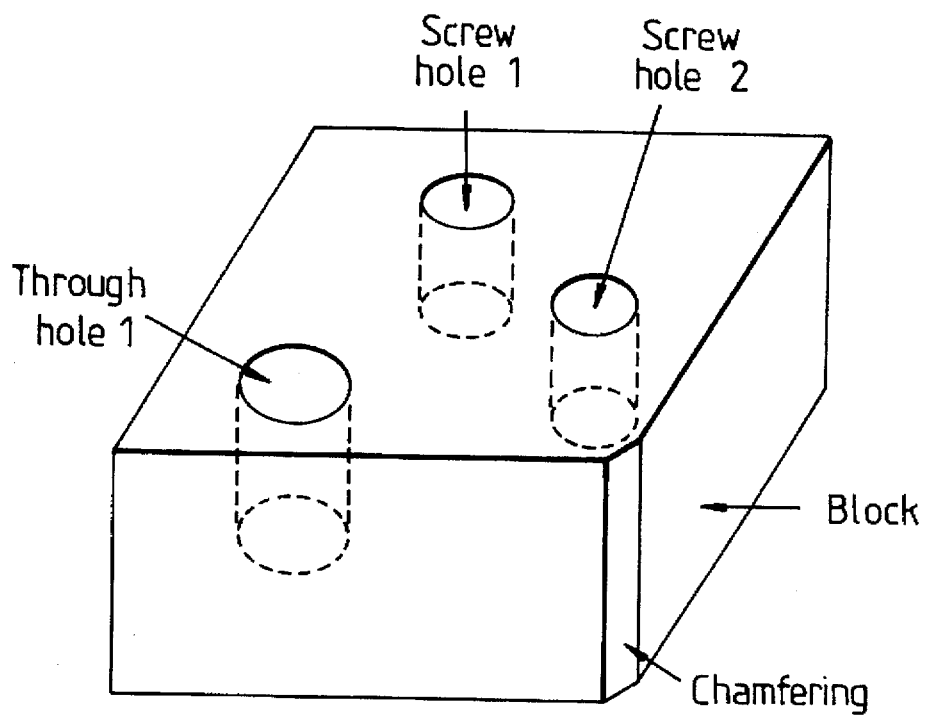
FIG. 2 shows a three-dimensional image of an object.

In order to understand the operation of this embodiment of the present invention, it is better to consider a specific case. Therefore, the following description refers to feature classification data which is classified by the shape of the feature, such as "hole arrangement", "screw hole", "through hole", "chamfering", or "block". Thus, as shown in FIG. 2, three-dimensional model data is provided representing a block which has a chamfered corner, with two screw holes and a through hole extending into the block.

Figure 3:
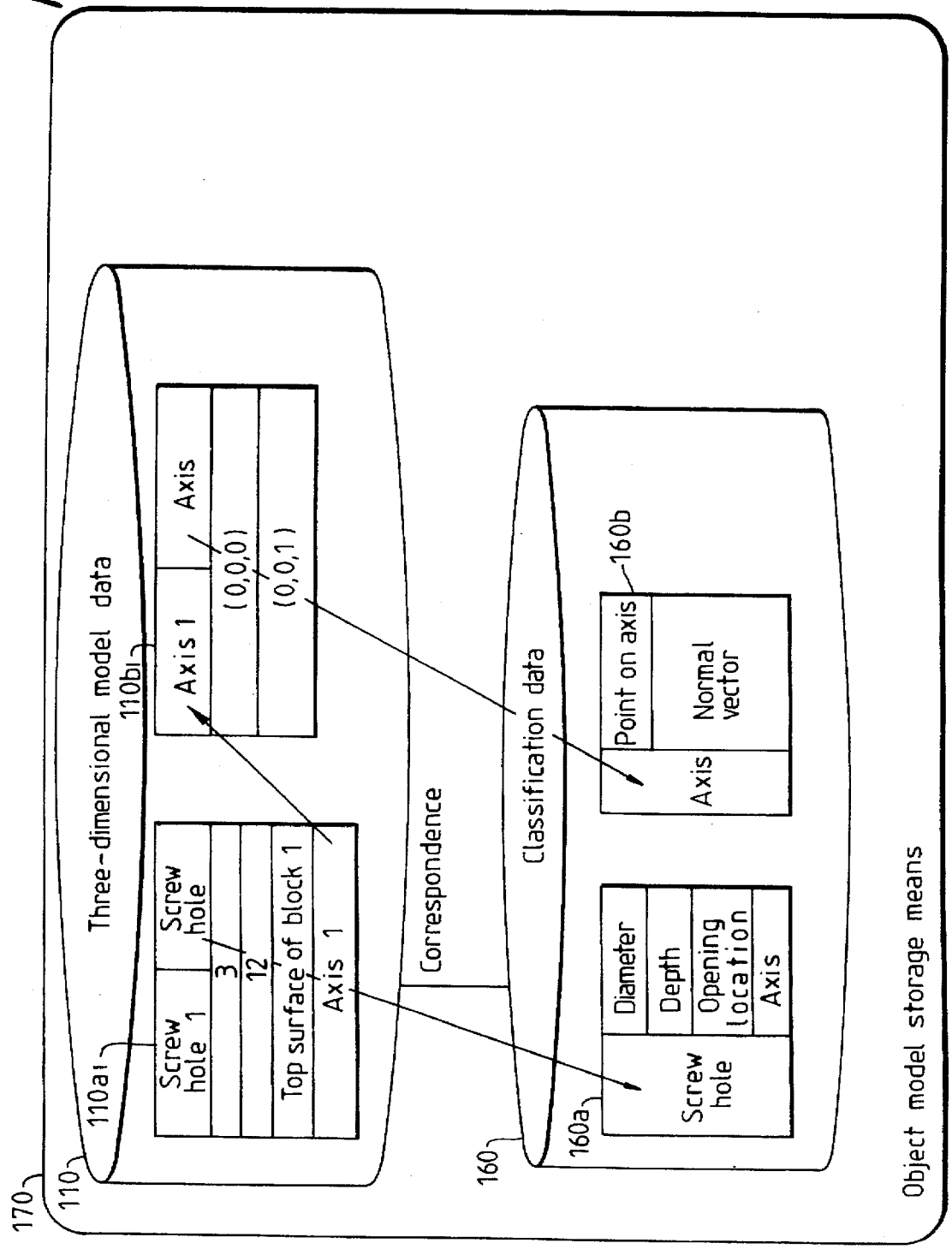
FIG. 3 is a schematic representation of the content of the object model storage means of the embodiment of FIG. 1.

FIG. 3 then illustrates schematically the content of the three-dimensional model data storage means 110 and the feature classification data storage means 160 of the object model storage means 170 shown in FIG. 1. As shown in FIG. 3, the feature classification data storage means 160 stores the classification name of each feature of the object and parameters for representing the feature. For example, the data for a screw hole has four parameters specifying the screw diameter, screw depth, opening surface for boring screw holes, and screw hole axis as shown in Table 160a in FIG. 3. The three-dimensional model data storage means 110 stores individual three-dimensional data in a format corresponding to the classification data. For example, for screw hole 1 of the three-dimensional model data shown in FIG. 2, data is stored in the format shown in Table 110a1 in FIG. 3 on the basis of the format of screw hole shown in Table 160a. Thus, Table 110a1 shows that the diameter of screw hole 1 is 3 units, the depth is 12 units, the opening of the screw hole is located in the top surface of Block 1, and the axis is Axis 1.

Figure 4:
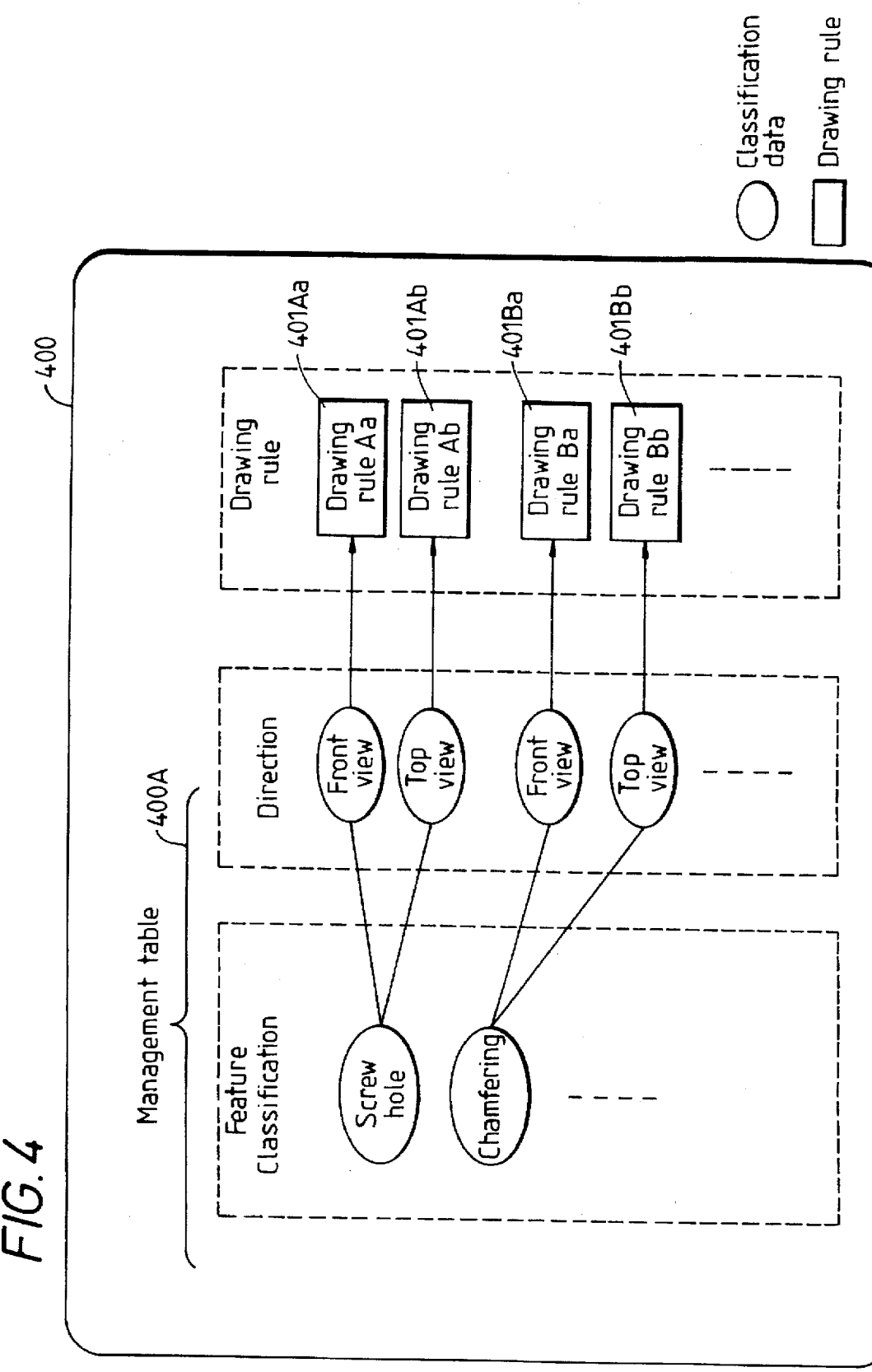
FIG. 4 is a schematic block diagram of the drawing rule storage means of the embodiment of FIG. 1.

FIG. 4 illustrates schematically the content of the drawing rule storage means 400 shown in FIG. 1. The drawing rule storage means 400 stores a management table 400A and data corresponding to a plurality of drawing rules. The drawing rules are classified by the management table 400A. The management table 400A has a structure in which the rules are organized by the feature classification of the feature and the viewing direction. For example, as shown in FIG. 4, to draw a front view of the screw hole, the drawing rule Aa stored in the memory area 401Aa is selected. To draw a top view of the chamfering, the drawing rule Bb stored in the memory area 401Bb is selected.

Figure 5:
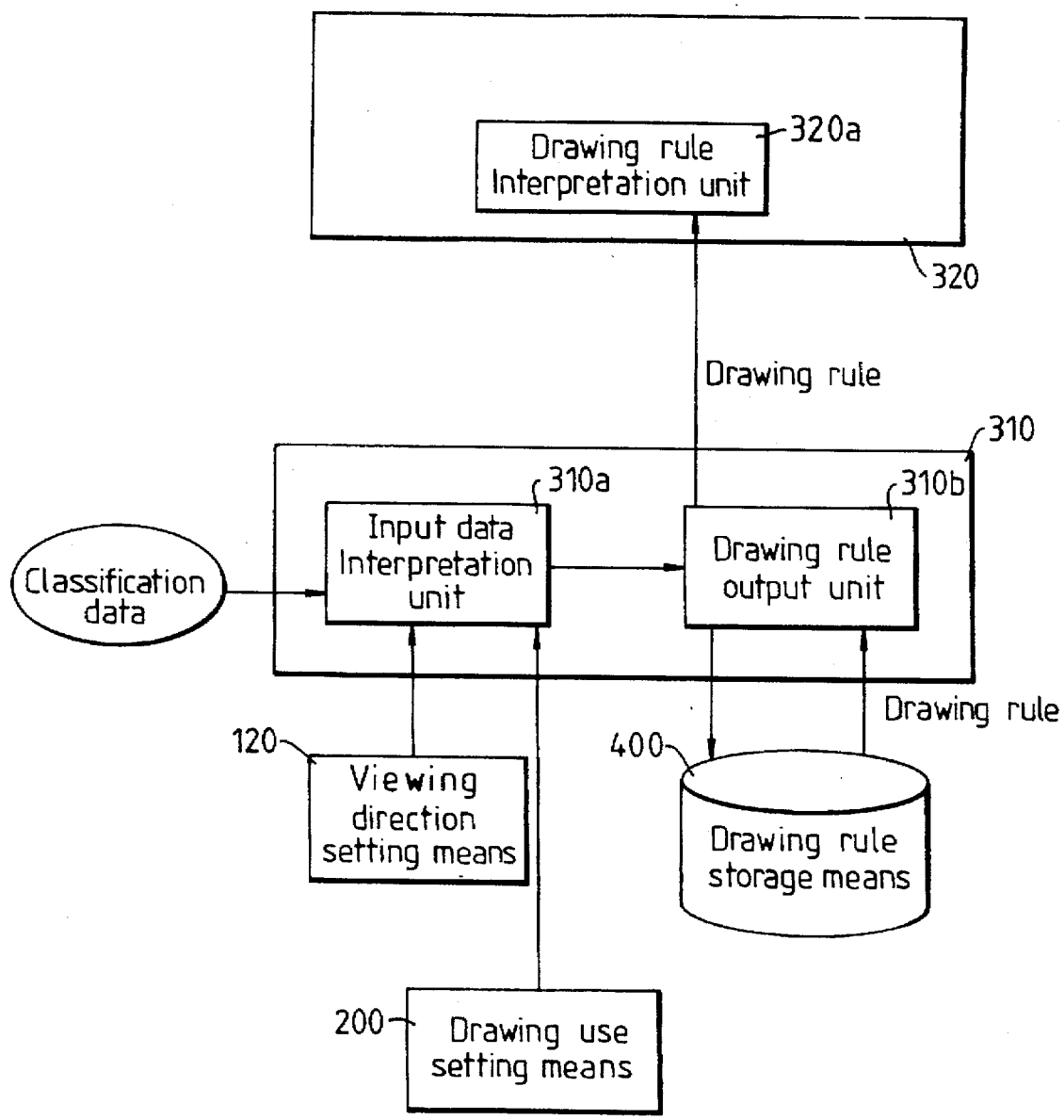
FIG. 5 is a block diagram showing in more detail the structure of the drawing rule selection means in the embodiment of FIG. 1.

FIG. 5 shows the operational configuration of the drawing rule selection means 310 in more detail, and the operation of the drawing rule selection means 310 will now be explained. FIG. 5 shows that the drawing rule selection means 310 has an input data interpretation unit 310a and a drawing rule output unit 310b.

The input data interpretation unit 310a receives the classification data from the object model storage means 170 and data representing the selected viewing direction which is generated by the viewing direction setting means 120. This data is passed to the drawing rule output unit 310b. The drawing rule output unit 310b retrieves the drawing rule for the selected viewing direction data, which corresponds to the classification data of the feature, from the drawing rule storage means 400 using the data which is sent from the input data interpretation unit 310a. The drawing rule thus retrieved is passed to the drawing rule execution means 320.

Figure 6:
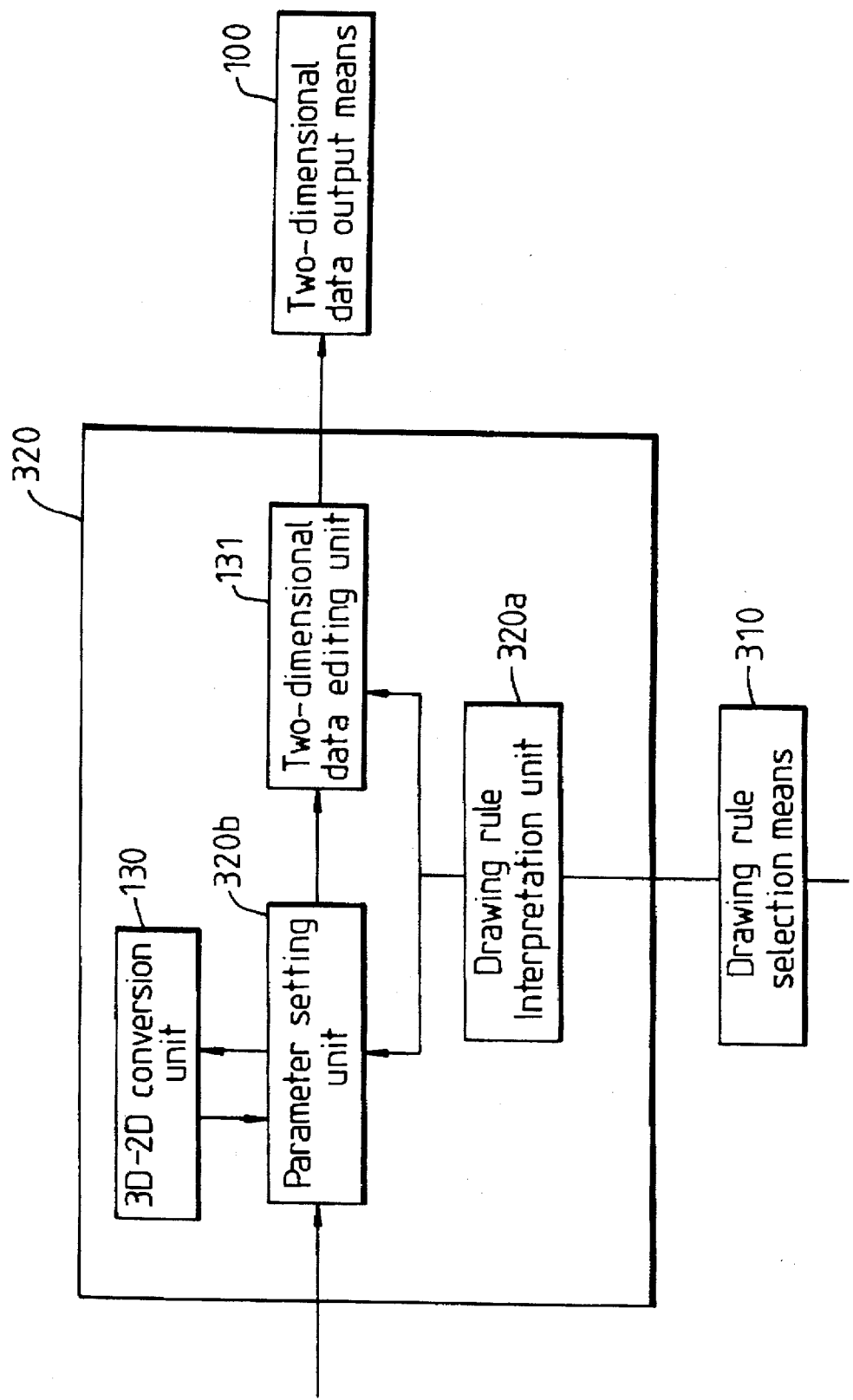
FIG. 6 is a schematic block diagram showing in more detail the drawing rule execution means in the embodiment of FIG. 1.

Next, the detailed operational configuration of the drawing rule execution means 320 will be explained with reference to FIG. 6. FIG. 6 shows that the drawing rule execution means 320 has a 3D (three dimensions)-2D (two dimensions) conversion unit (hereinafter called a 3D-2D conversion unit) 130 for converting three-dimensional model data to two-dimensional data, a two-dimensional data editing unit 131 for editing two-dimensional data, a drawing rule interpretation unit 320a for interpreting the drawing rule which is selected by the drawing rule selection means 310, and a parameter setting unit 320b.

As illustrated in FIG. 1, this embodiment of the present invention may include a drawing use setting means 200 to specify the purpose of the drawing. The input data interpretation unit 310a receives classification data from the object model storage means 170, viewing direction data from the viewing direction setting means 120, and drawing use data from the drawing use setting means 200, which drawing use data indicates the purpose of the drawing, e.g. for design or for manufacturing the object.

FIG. 1 also shows a drawing rule editing means 330 permitting editing of the drawing rules stored in the drawing rule storage means 400. The operation of the drawing rule editing means 330 will be explained later.

To obtain a top view for designing the screw hole 1 of the object shown in FIG. 2, the following procedure may be used. In the following description, it is assumed that the drawing use setting means 200 and viewing direction setting means 120 are keyboards and the two-dimensional data output means 100 is a display unit such as a screen (CRT, VDU). However, the two-dimensional data output means may be a graphical plotter or printer, producing a hard copy of the two-dimensional image. It is also assumed that the content of the object model storage means 170 corresponds to the arrangement shown in FIG. 3.

Figure 7A:
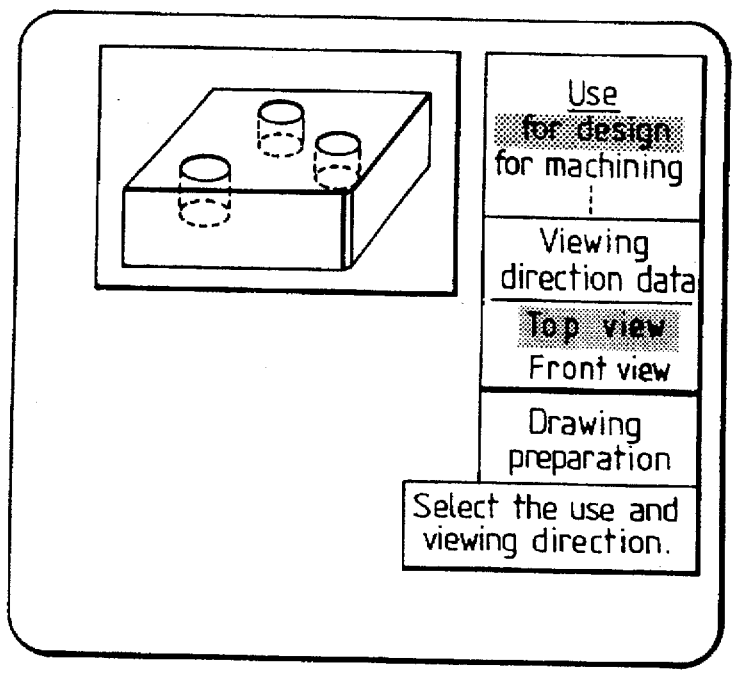
FIGS. 7(a) and 7(b) illustrate a selection screen and a display screen produced by the embodiment of FIG. 1.
Figure 7B:
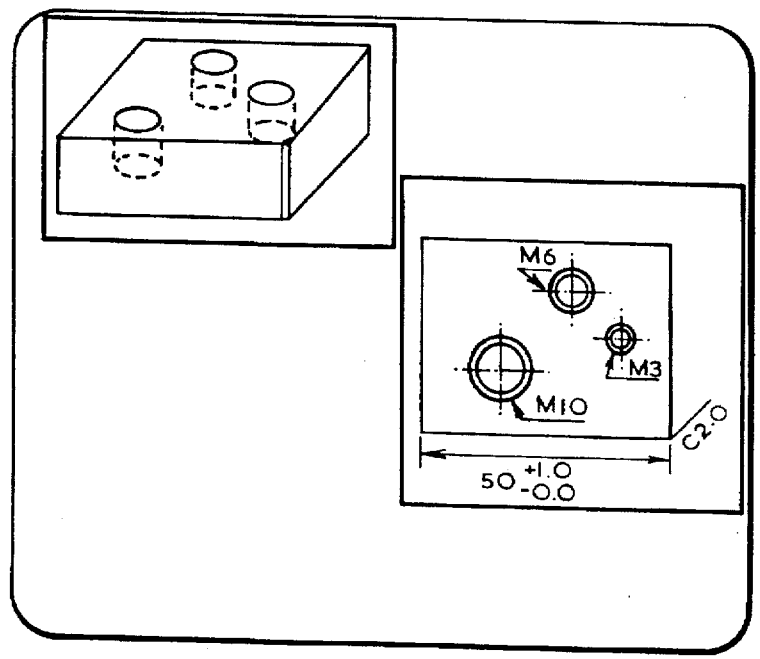

The procedure then includes the following steps:

(1) Firstly, a window, for assisting the user to input data and viewing direction data, is displayed on the screen of the two-dimensional data output means 100 as shown in FIG. 7(*a*). The user identifies the purpose of the drawing and the viewing direction using the drawing use setting means 200 and the viewing direction setting means 120. The resulting data is then passed to the drawing rule selection means 310. In the window shown in FIG. 7(*a*), it is assumed that the user identifies the purpose as being "for design" and the viewing direction as "top view".

(2) Three-dimensional data representing "screw hole 1", which is stored in the three-dimensional model data storage means 110, is passed to the drawing rule execution means 320 and classification data representing "screw hole" is sent to the drawing rule selection means 310 from the feature classification data storage means 160.

Figure 8:
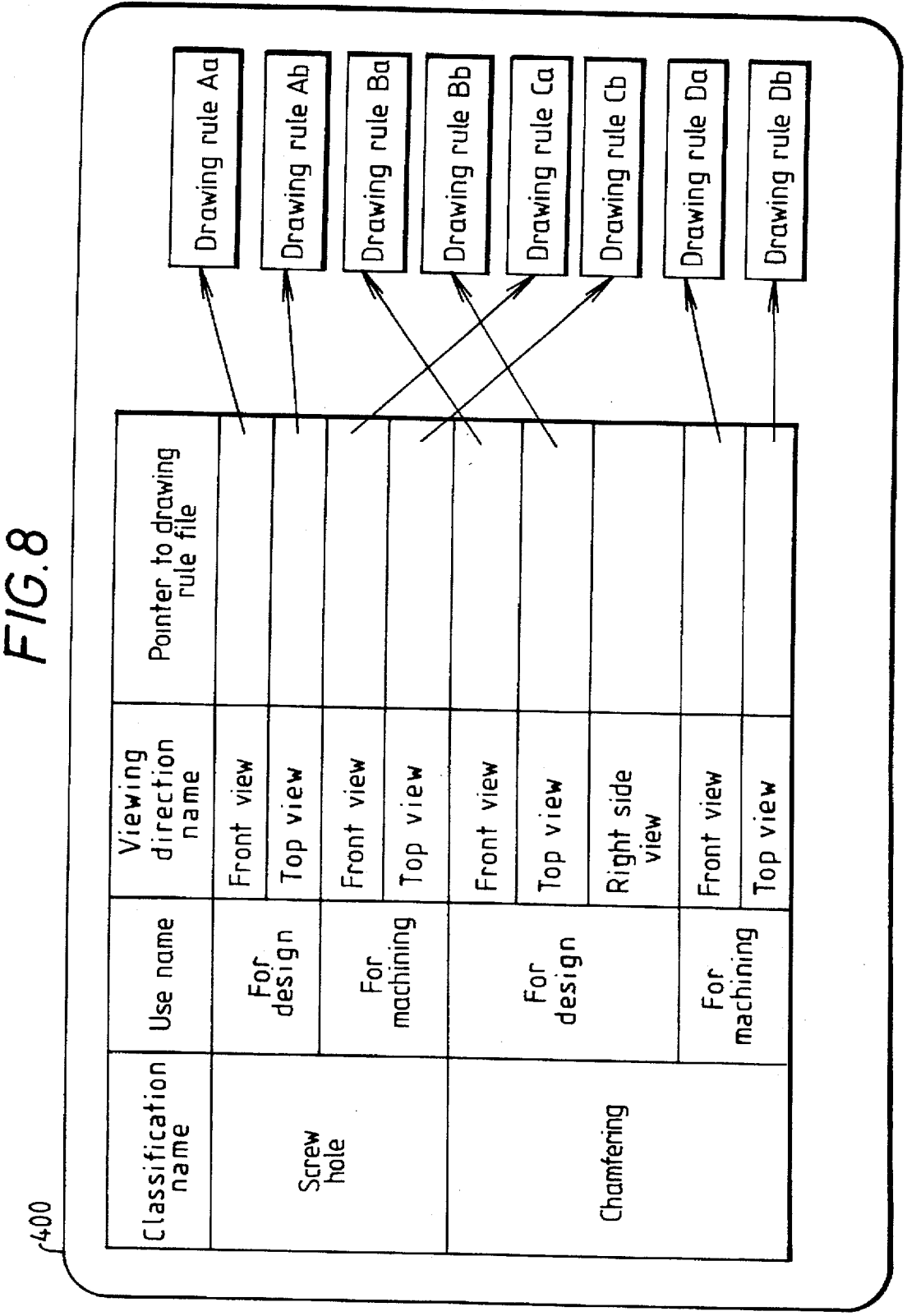
FIG. 8 is a schematic block diagram showing in more detail the action of the drawing rule storage means in the embodiment of FIG. 1.

(3) The drawing rule selection means 310 selects the relevant drawing rule from the drawing rule storage means 400 using the data produced in steps (1) and (2) above, and passes the drawing rule thus selected to the drawing rule execution means 320. Then, as shown in FIG. 8, a management table 400A of the drawing rule storage means 400 is accessed by the drawing rule selection means 310 to select "screw hole" from the group "classification name", to select "for design" from the group "use name", and then to select "top view" from the group viewing direction name for the selected classification name. By doing this, the drawing rule corresponding to "top view of screw hole for design" can be selected. Thus in FIG. 8, the drawing rule file Ab is selected and sent to the drawing rule execution means 320.

(4) When the drawing rule execution means 320 receives the relevant drawing rule file and the three-dimensional data corresponding to "screw hole 1", it interprets the content described in the file and generates the specified two-dimensional data. It does this by first sending the drawing rule file to the drawing rule interpretation unit 320*a* of the drawing rule execution means 320. It is assumed that, as shown in the drawing rule file of FIG. 9, the use and classification name of this drawing rule are described in a first line, and the correspondence between the parameters which are used for command execution and three-dimensional data is described in a second line. Commands for generating and editing two-dimensional data are described in third and subsequent lines. Since management data is described on the first line of the drawing rule file, the second and subsequent lines can be interpreted line by line.

The drawing rule interpretation unit 320*a* interprets the second line of the drawing rule file and generates a correspondence table in the parameter setting unit 320*b*, that correspondence table being shown in FIG. 10. For 3D-2D conversion, the drawing rule interpretation unit 320*a* sends the three-dimensional model data to the 3D-2D conversion unit 130 and stores the converted result in the correspondence table. For example, when the content of the drawing rule file Ab corresponds to that shown in FIG. 4 and data indicating that "variable d indicates a screw hole diameter" is sent to the parameter setting unit 320*b*, the screw hole diameter is set in dependence on the variable d. In this example, the diameter d of "screw hole 1" is set to 3 as shown in FIG. 10.

Next, data indicating that "(px, py) is a point on the axis which is subjected to coordinate transformation" is sent to the parameter setting unit 320*b*. In this case, it is assumed that a function of proj(x) is a function for subjecting a point x to coordinate transformation. In this example, the point on the axis, that is, the coordinate value (0, 0, 0) on the axis 1, is sent to the 3D-2D conversion unit 130 so as to transform the coordinates thereof and as a result of conversion, (px, py) is set to (0, 0) as shown in FIG. 10.

Next, the drawing rule interpretation unit 320*a* interprets the third and subsequent lines of the drawing rule file Ab line by line and sends appropriate subroutines and names sequentially to the two-dimensional data editing unit 131.

Figure 11:
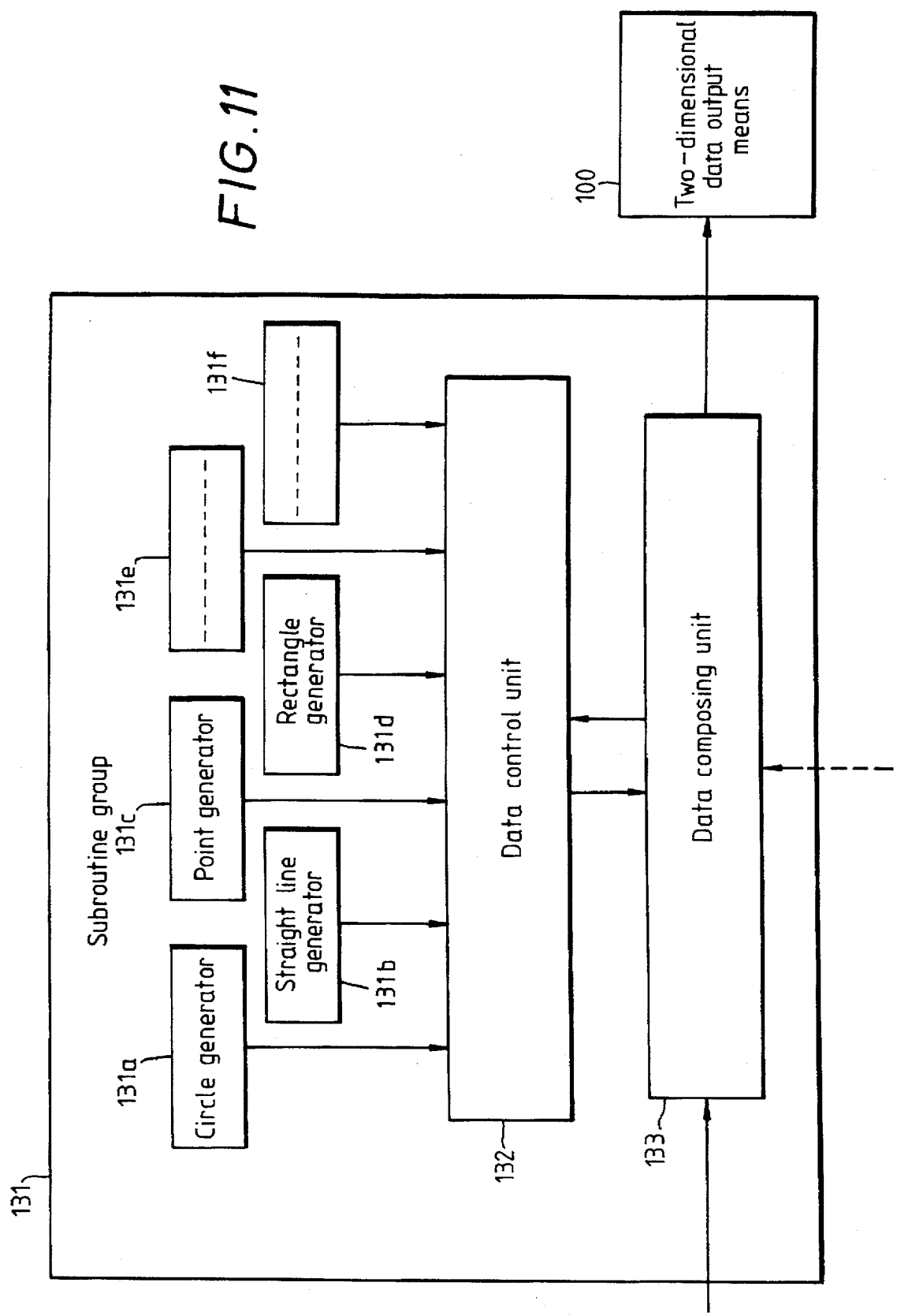
FIG. 11 is a schematic block diagram showing in more detail the content of the two-dimensional editing unit.

The configuration of the two-dimensional data editing unit 131 is shown in FIG. 11. In FIG. 11, data which is sent to the two-dimensional data editing unit 131 is supplied to a data composing unit 133. The data composing unit 133 sends data indicating the subroutine which is necessary to generate a specific graphical symbol to a data control unit 132. The data control unit 132 drives a graphic generator 131*a* to 131*f* corresponding to the subroutine and sends the parameters necessary to generate the graphical symbol to the data composing unit 133.

The data composing unit 133 substitutes the values given in the correspondence table of the parameter setting unit 320*b* for the parameters so as to prepare a final graphical object. For example, in the example in FIG. 9, the term "scirc" on the third line of the description indicates a command for drawing a circle, and when a combination of "scirc center point diameter" is set, this indicates that a circle is to be generated.

When a character string of corresponding to "scirc (px, py) d" is sent to the data control unit 132 via the data composing unit 133, the data control unit 132 drives a circle generator 131*a* and notifies the data composing unit 133 that a circle is to be drawn by substituting the value of (px, py) for the "center point" and the value of d for the "diameter".

The data composing unit 133 retrieves the values of center point and radius which are necessary to draw a circle, that is, the values of (px, py) and d in this case from the parameter setting unit 320*b* and draws a circle. The effect is shown in FIG. 12(*a*). The two-dimensional data is sent to the two-dimensional data output means 100 and the result is shown in FIG. 13(*a*).

Then, for the fourth line of the description of the drawing rule file Aa, a command for drawing a circle is executed in the same way as for the third line. For the "diameter" of the parameter for drawing the circle, a value "d+0.2" is used. The result is shown in FIG. 12(*b*) and the effect of this on the two-dimensional data is shown in FIG. 13(*b*).

There is a command for drawing a straight line on the fifth and sixth lines of the drawing rule file Aa, and these commands are processed in the same way.

FIGS. 12(*a*) to 12(*d*) thus show the interpretation result for each line, that is, the two-dimensional data which is generated for each line of the drawing rule file Ab. FIGS. 13(*a*) to 13(*d*) then show the two-dimensional data which is drawn by the two-dimensional output means 100 whenever the interpretation of each line ends. When the interpretation of the drawing rule Aa ends, the image shown in FIG. 13(*d*) is drawn by the two-dimensional data output means 100. When this processing is executed for the object shown in FIG. 2, the image shown in FIG. 7(*b*) is obtained.

FIGS. 14(*a*) and 14(*b*), FIGS. 15(*a*) and 15(*b*), and FIGS. 16(*a*) and 16(*b*) show further examples of images that may be produced using this embodiment of the present invention.

Figure 14A:
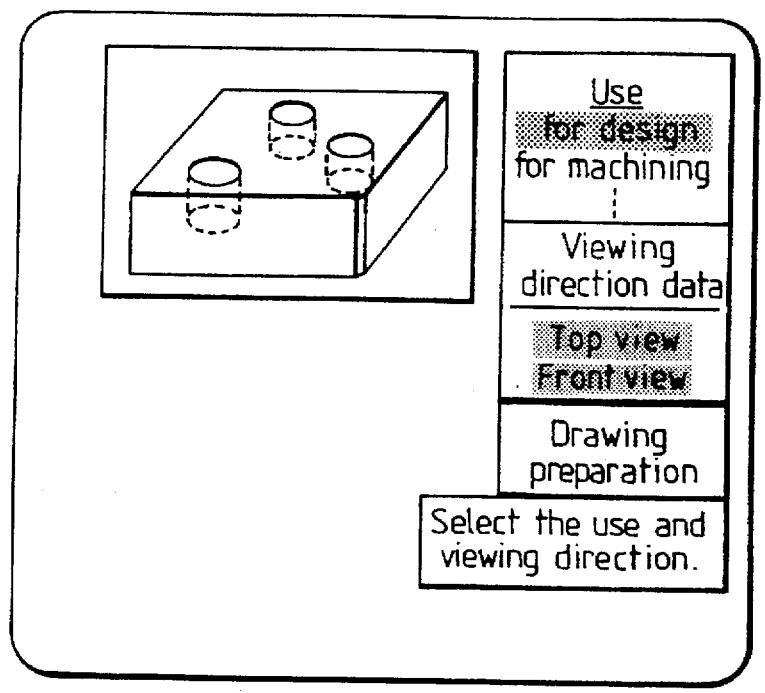
FIGS. 14(a) and 14(b) show another example of screens which may be generated by the embodiment of FIG. 1.
Figure 14B:
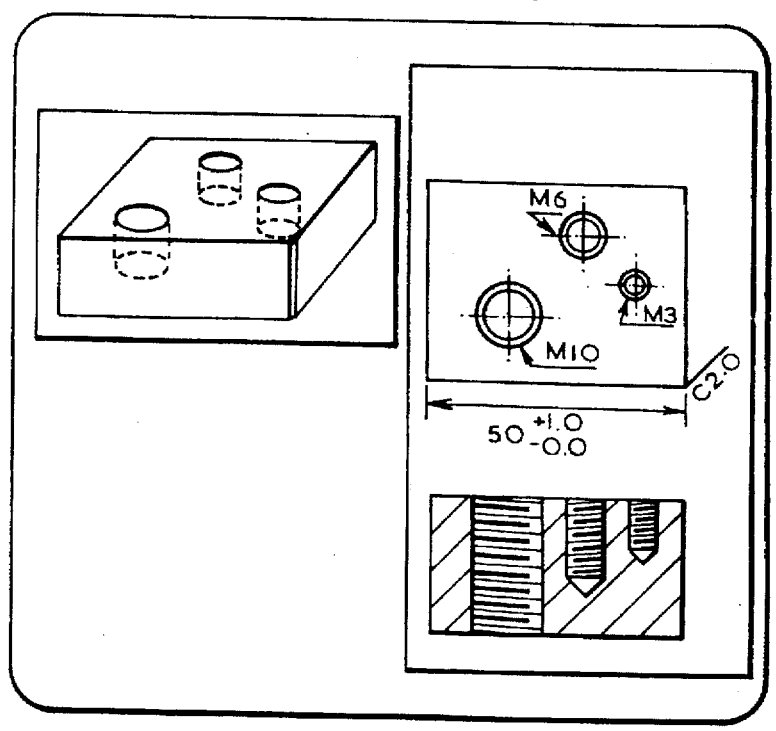

FIGS. 14(a) and 14(b) show an example in which a plurality of viewing directions are specified for one drawing use. In the example, the "top view" and "front view" of the three-dimensional model shown in FIG. 14(a) is prepared for "for design", so that there are two images generated, as shown in FIG. 14(b).

Figure 15A:
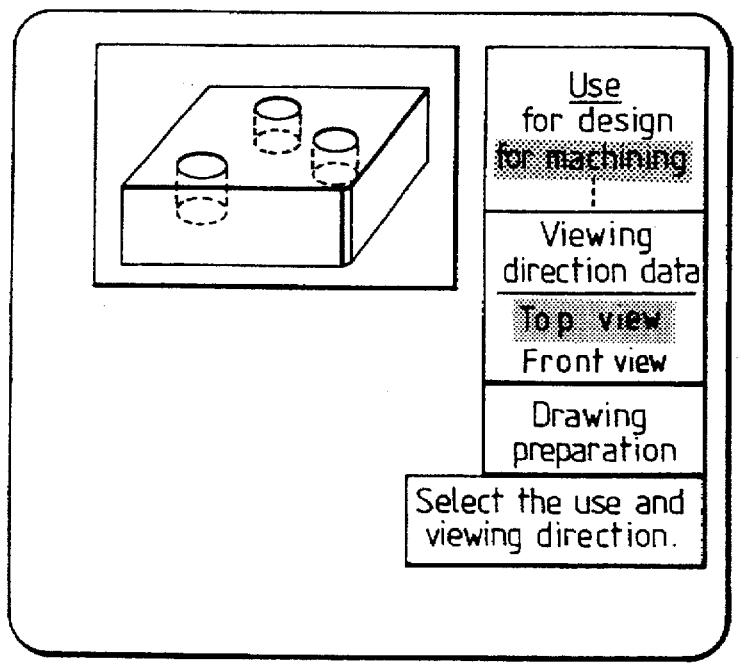
FIGS. 15(a) and 15(b) show another example of screens which may be produced by the embodiment of FIG. 1.
Figure 15B:
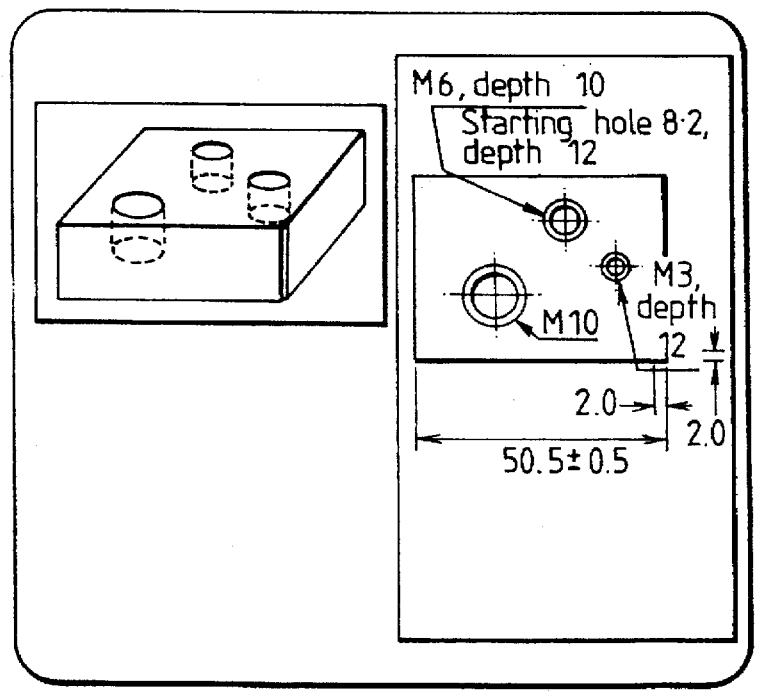

FIGS. 15(a) and 15(b) show an example in which the drawing use is changed from "for design" to "for machining". In this example, the "top view" of the three-dimensional model shown in FIG. 15(a) is prepared for "for machining" and the resulting image is shown in FIG. 15(b). FIG. 14(b) and FIG. 15(b) are thus different visual presentation or images from the same three-dimensional model, and the user may select either depending on the intended use of the image.

Figure 16A:
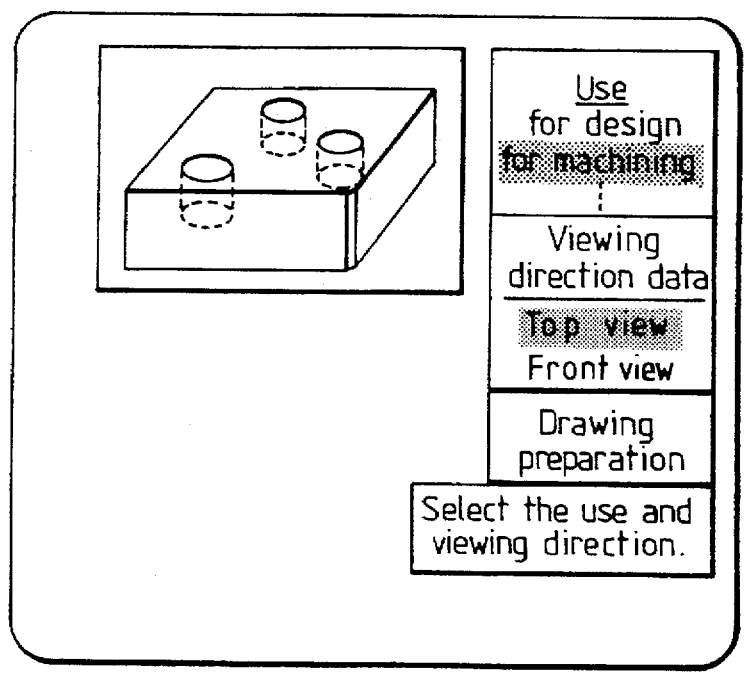
FIGS. 16(a) and 16(b) show another example of the screens which may be produced by the embodiment of FIG. 1.
Figure 16B:
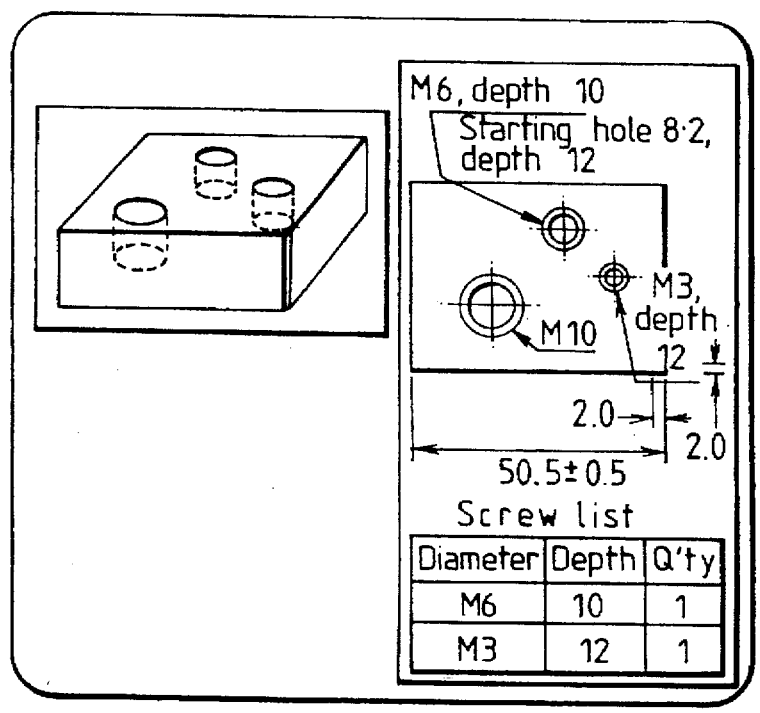

FIGS. 16(a) and 16(b) show another example in which, by presetting a drawing rule to be entered in a numeric table in a drawing, not only a graphical image is drawn but also characters can be displayed in a table associated with the image.

Figure 17A:
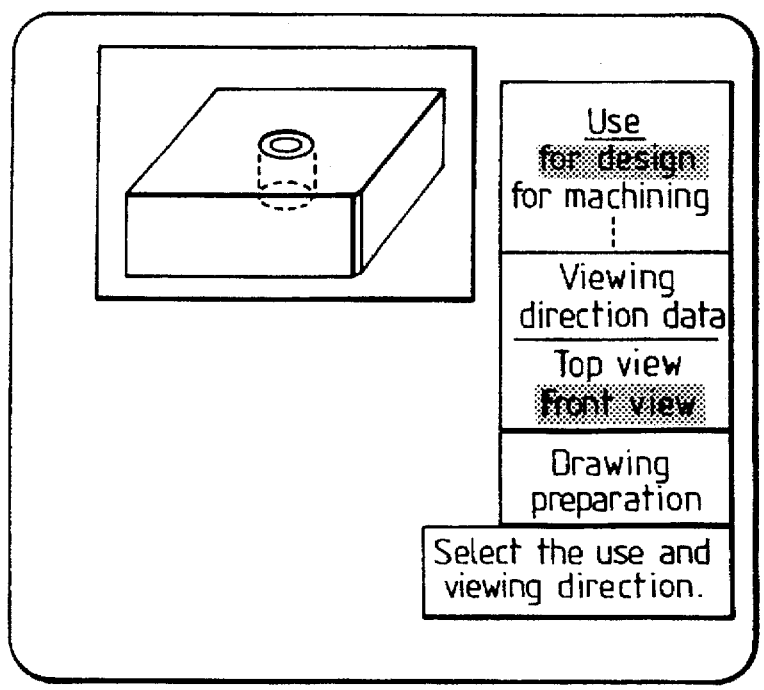
Figure 17B:
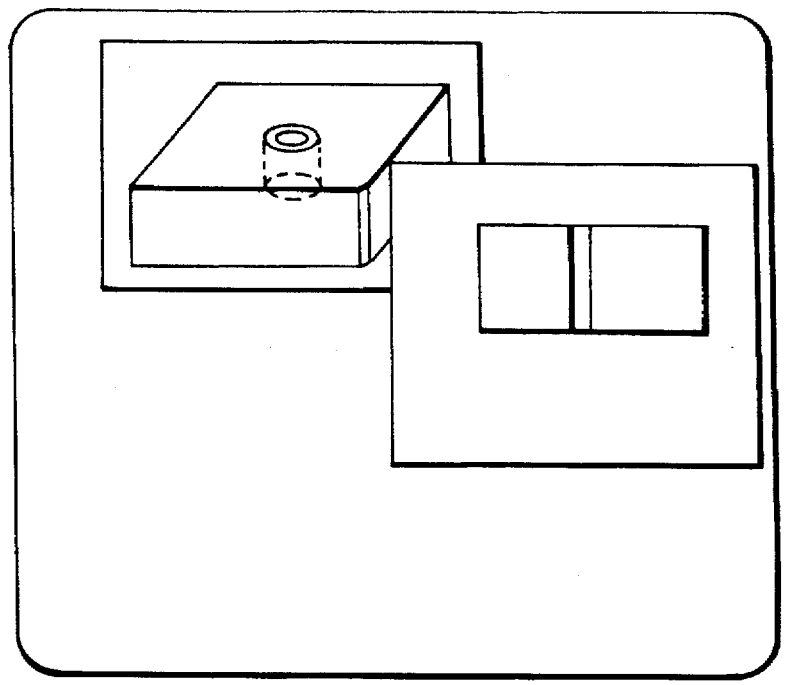
Figure 17C:
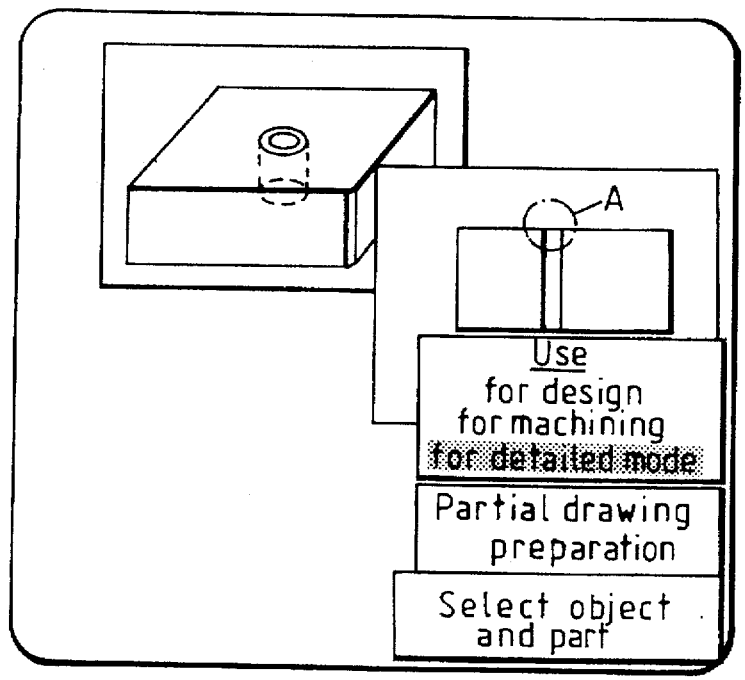
Figure 17D:
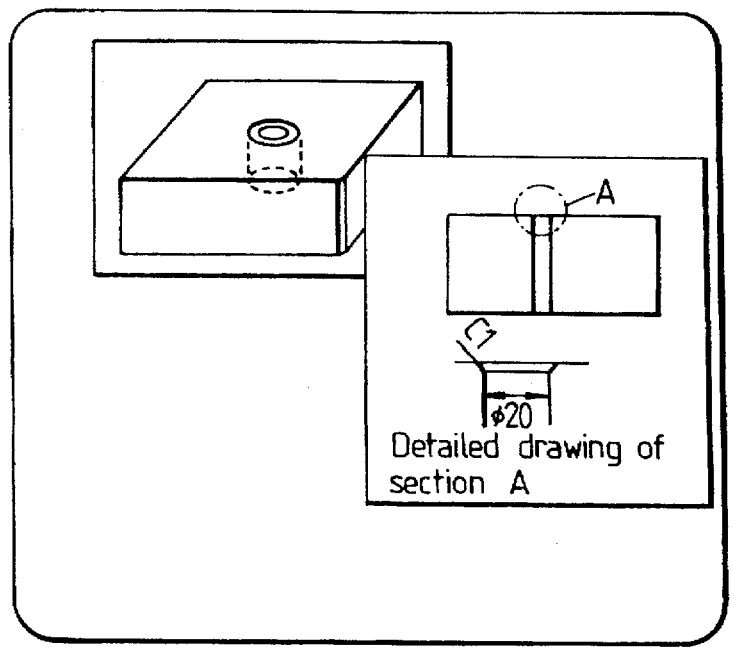

FIGS. 17(a)–17(e) show an embodiment in which a feature can be drawn by a plurality of drawing rules. In the embodiment illustrated, two drawing rules are used to draw a body having a chamfered through hole as shown in FIG. 17(a). In FIG. 17(b), the feature is drawn using the drawing rule for design use and for a front view. But the chamfered part is so small that it cannot be seen clearly. In such a case, it is necessary to display a detailed view of the chamfered part, namely, the part A of FIG. 17(c) on another place of the same screen. In this embodiment, the user designates a detailed mode for drawing the chamfered part A. Then, the system of the present invention uses another drawing rule as shown in FIG. 17(e) and displays the detailed view of the part A drawn in FIG. 17(d). This rule is specified for any through hole to be chamfered. In this case, a NTS (not-to-scale) is automatically obtained as shown in FIG. 17(d).

Figure 18A:
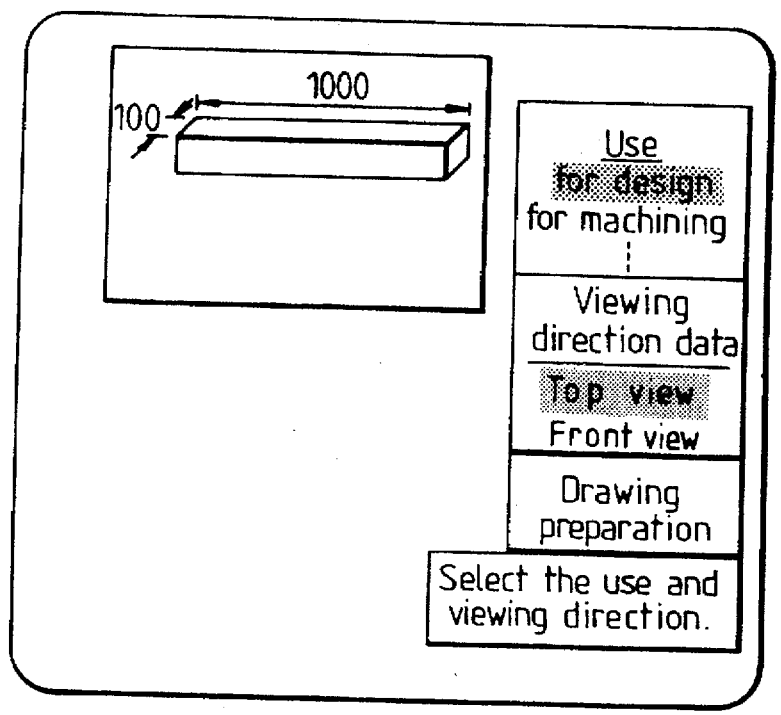
Figure 18B:
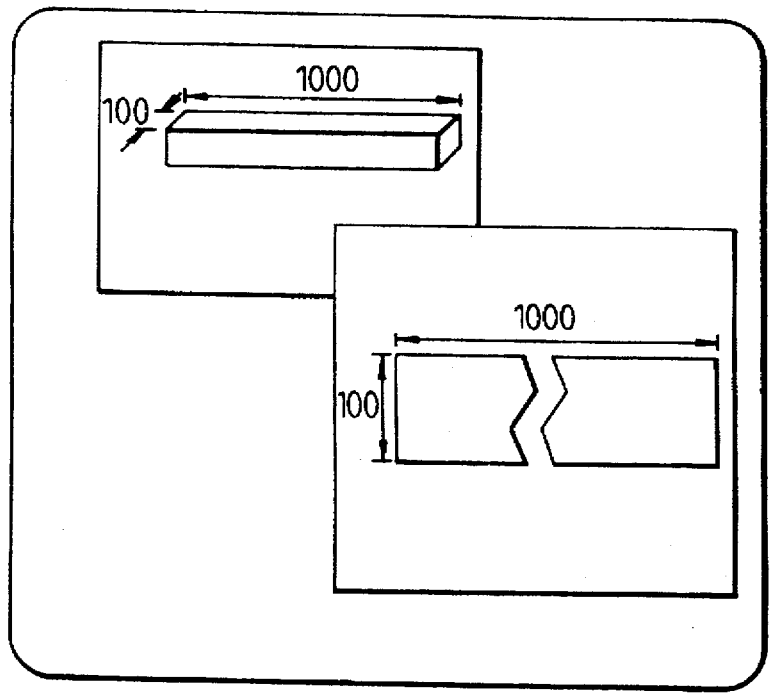

FIGS. 18(a) to 18(c) show an example in which a drawing rule for preparing a simplified drawing is pre-defined. In this way, an image including a simplified drawing can be obtained automatically. The three-dimensional model shown in FIG. 18(a) cannot be shown easily because its length is wide, e.g. 1000 units, relative to its width, e.g. 100 units. In such a case, a simplified image may be produced as shown in FIG. 18(b). A rule is specified, as shown in FIG. 18(c), such that "When the height of the object is longer than the length of the object by a predetermined ratio, or the length of the object is greater than the width of the object by a predetermined ratio, prepare a simplified (reduced) image". Thus, a drawing including an reduced image can be obtained as shown in FIG. 18(b).

Figure 19:
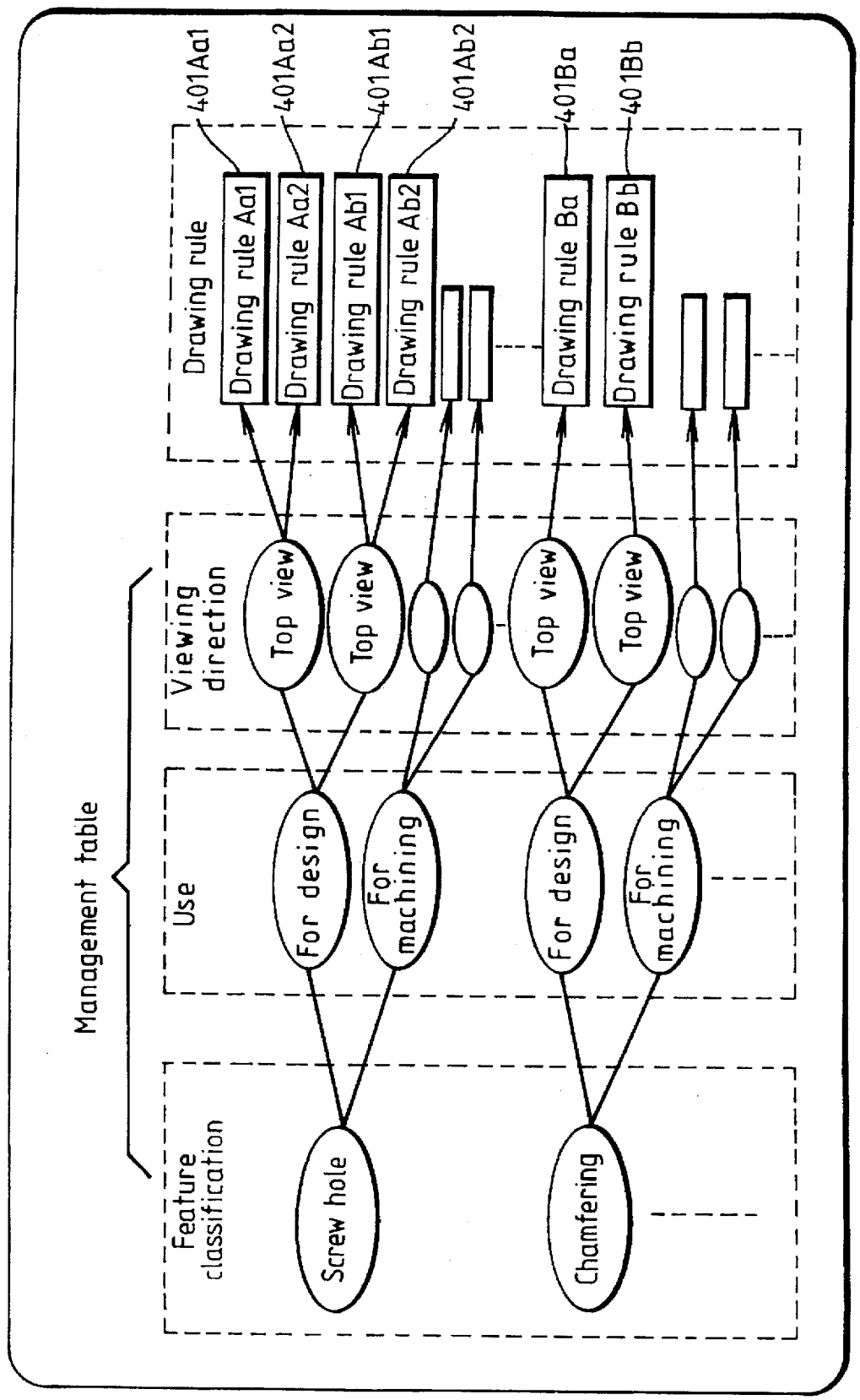
FIG. 19 is a schematic block diagram showing the drawing rule storage means of another embodiment.
Figure 20A:
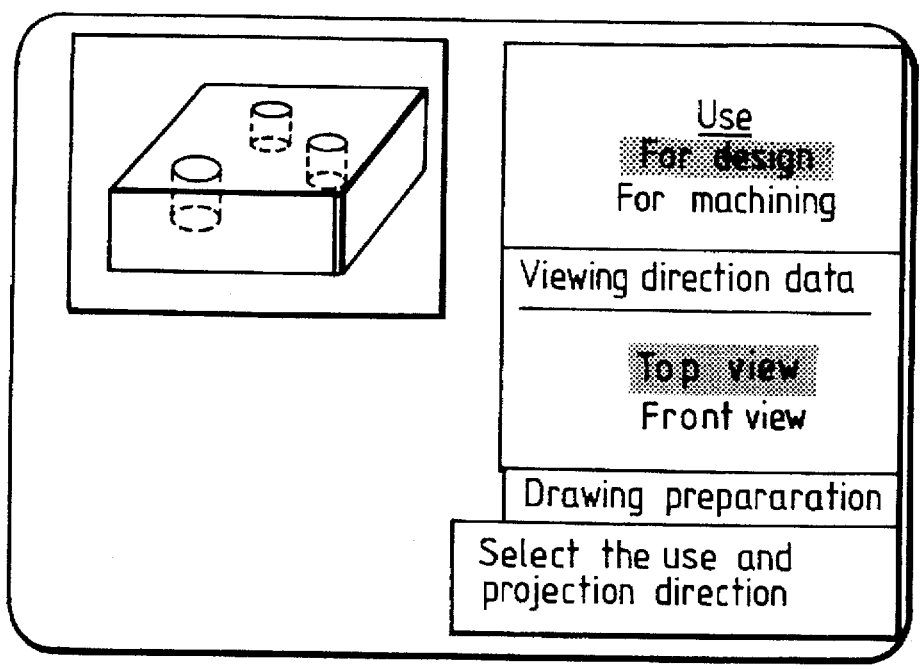
FIGS. 20(a) to 20(c) illustrate screens illustrating the operating involved in the storing of the drawing rules by the drawing rule storage means of FIG. 19.
Figure 20B:
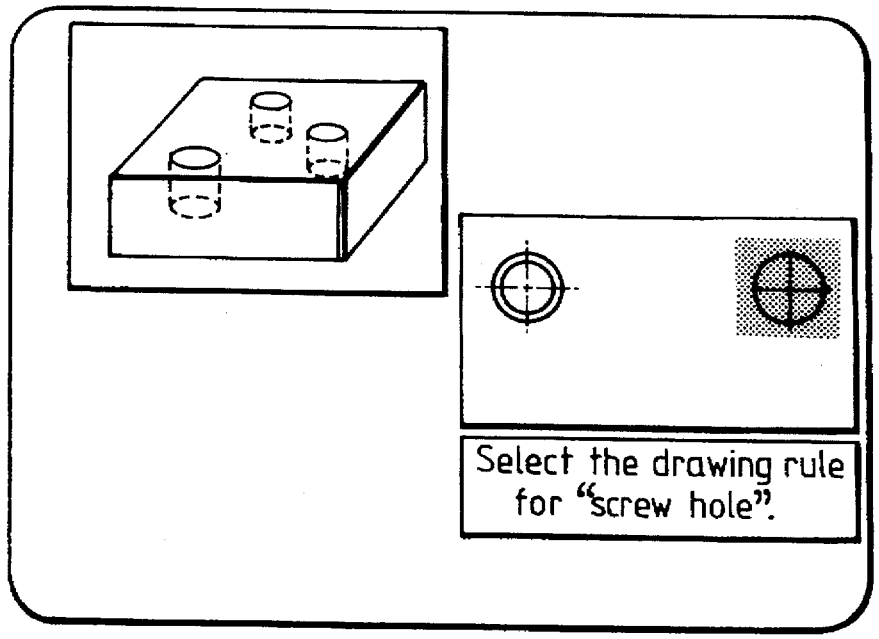
Figure 20C:
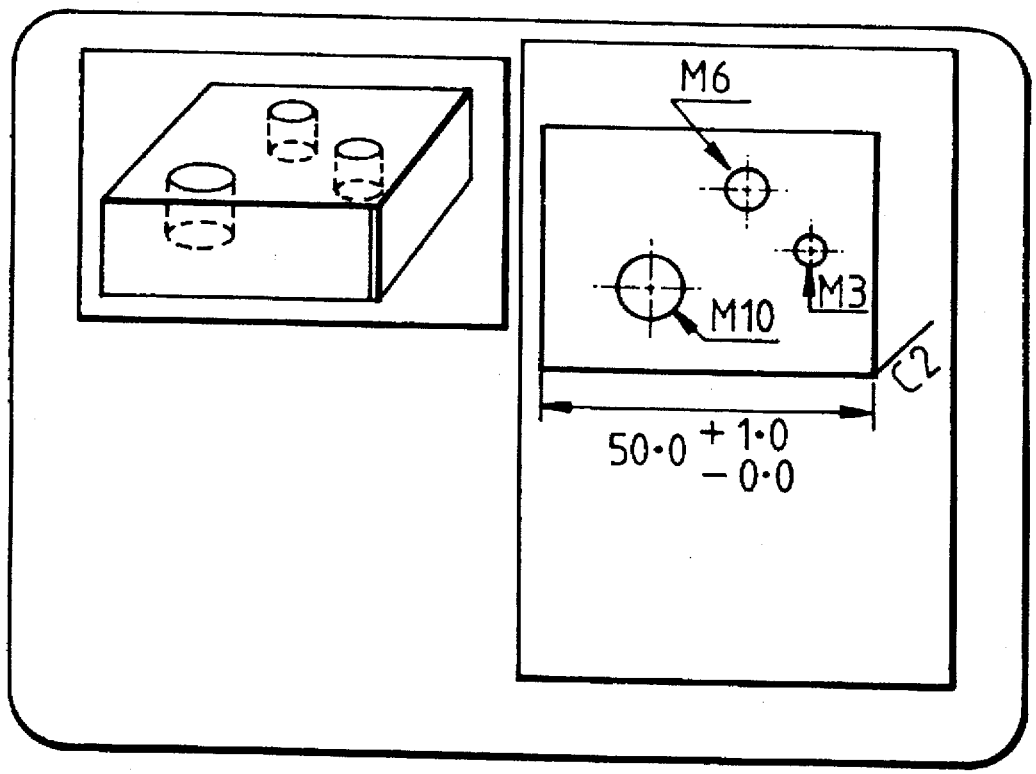

FIG. 19 shows the content of the drawing rule storage means 400 when there are a plurality of drawing rules for a feature, each use, and viewing direction. FIGS. 20(a) to 20(c) show the operation of the drawing rule storage means 400 when it has the content shown in FIG. 19. For example, when there are two drawing rules provided for "top view" of "screw hole" as shown in FIG. 19, the screen for requesting drawing rule selection, which is shown in FIG. 20(b), is output. When the user selects the relevant drawing rule, an image conforming to the drawing rule which is specified by the user is displayed on the screen of the two-dimensional data output means 100 as shown in FIG. 20(c).

Figure 21A:
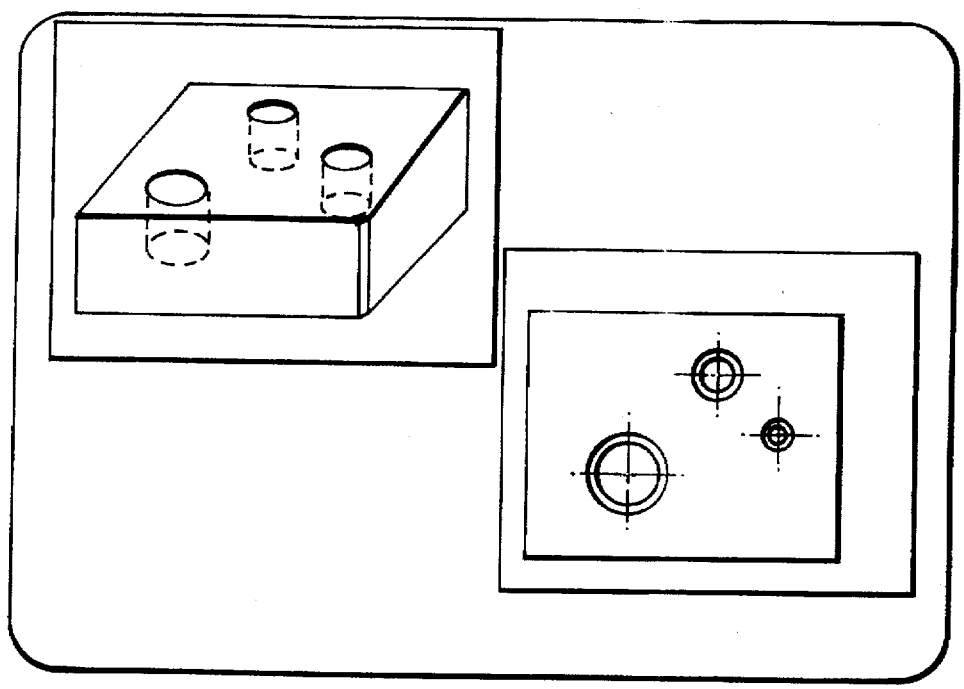
FIGS. 21(a) to 21(d) illustrate further screens illustrating the operations involved in the storing of drawing rules by the drawing rule storage means of FIG. 19.
Figure 21B:
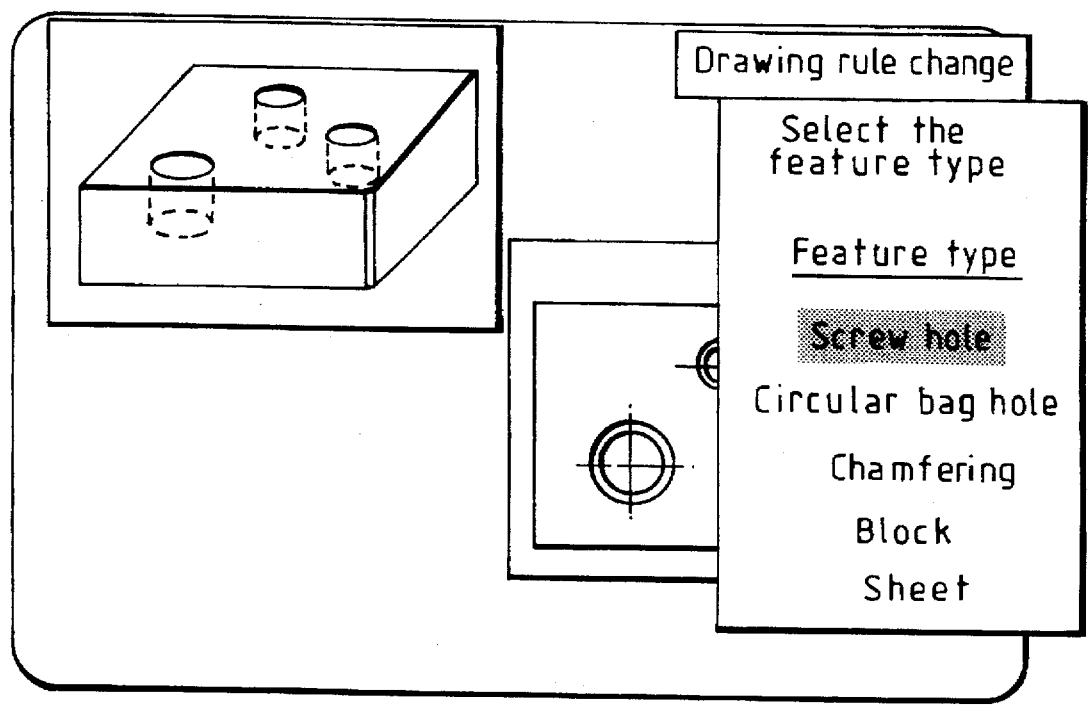
Figure 21C:
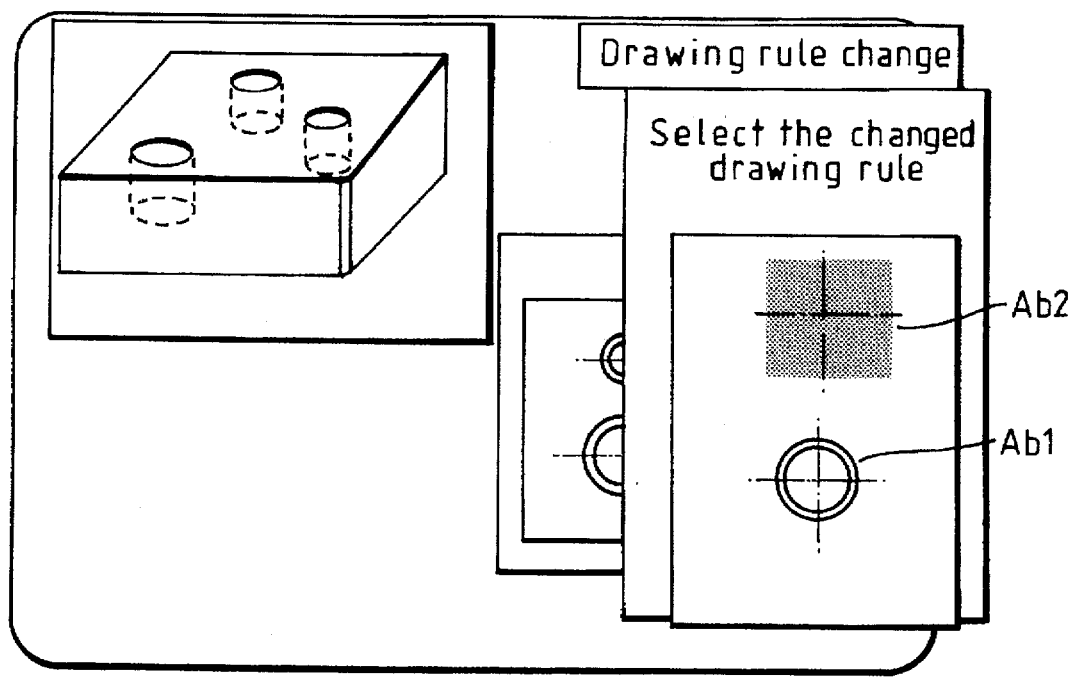
Figure 21D:
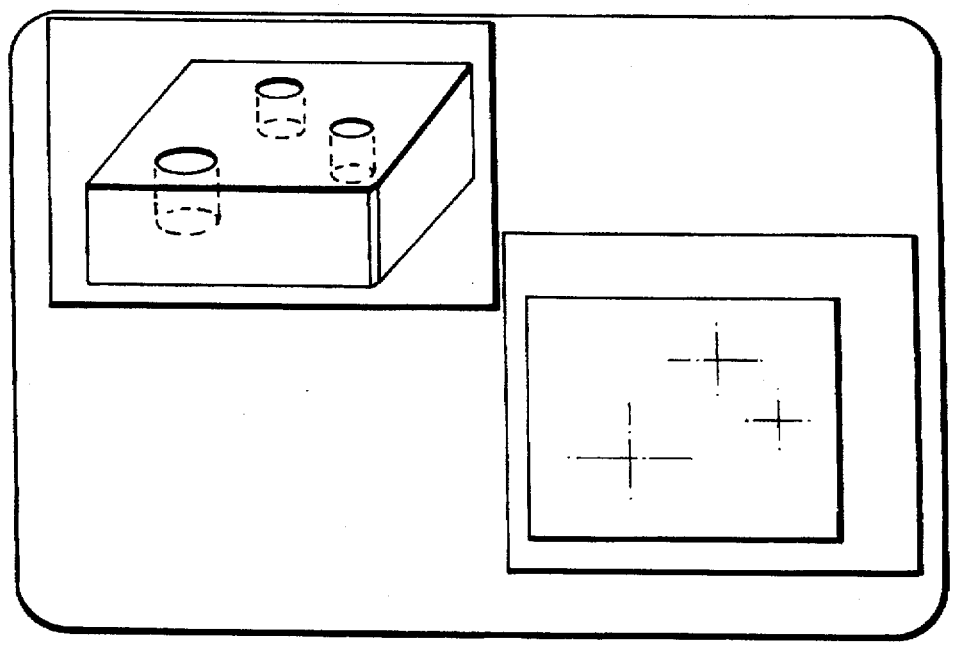

FIGS. 21(a) to 21(d) show an arrangement in which the drawing rules are stored as described in FIG. 19. Suppose that a screw hole is drawn by the drawing rule Ab1 in FIG. 19, and the view of the screw hole is shown in FIG. 21(a). If the user inputs a command of "drawing rule change", the drawing rule for the screw holes is required to be changed, and the screen is then as shown in FIG. 21(b). When the drawing rule change is required, selectable drawing rules are displayed as shown by FIG. 21(c) and the drawing rule to be changed, for example the rule Ab2, is selected by the user. Then, all views of the screw holes displayed in FIG. 21(a) are drawn by the drawing rule Aa2 as shown in FIG. 21(d).

As has previously been mentioned, the embodiment of the present invention shown in FIG. 1 has a drawing rule editing means 330. This drawing rule editing means 330 permits a user to alter the drawing rules stored in the storage means 400. There are many such alterations that are possible. The user may modify existing drawing rules so that the official presentation of a feature of an object will be changed from some or all of its viewing angles. The user may also add new drawing rules, for example to extend the drawing rules associated with each feature to permit a wider range of uses of the final image.

Figure 22:
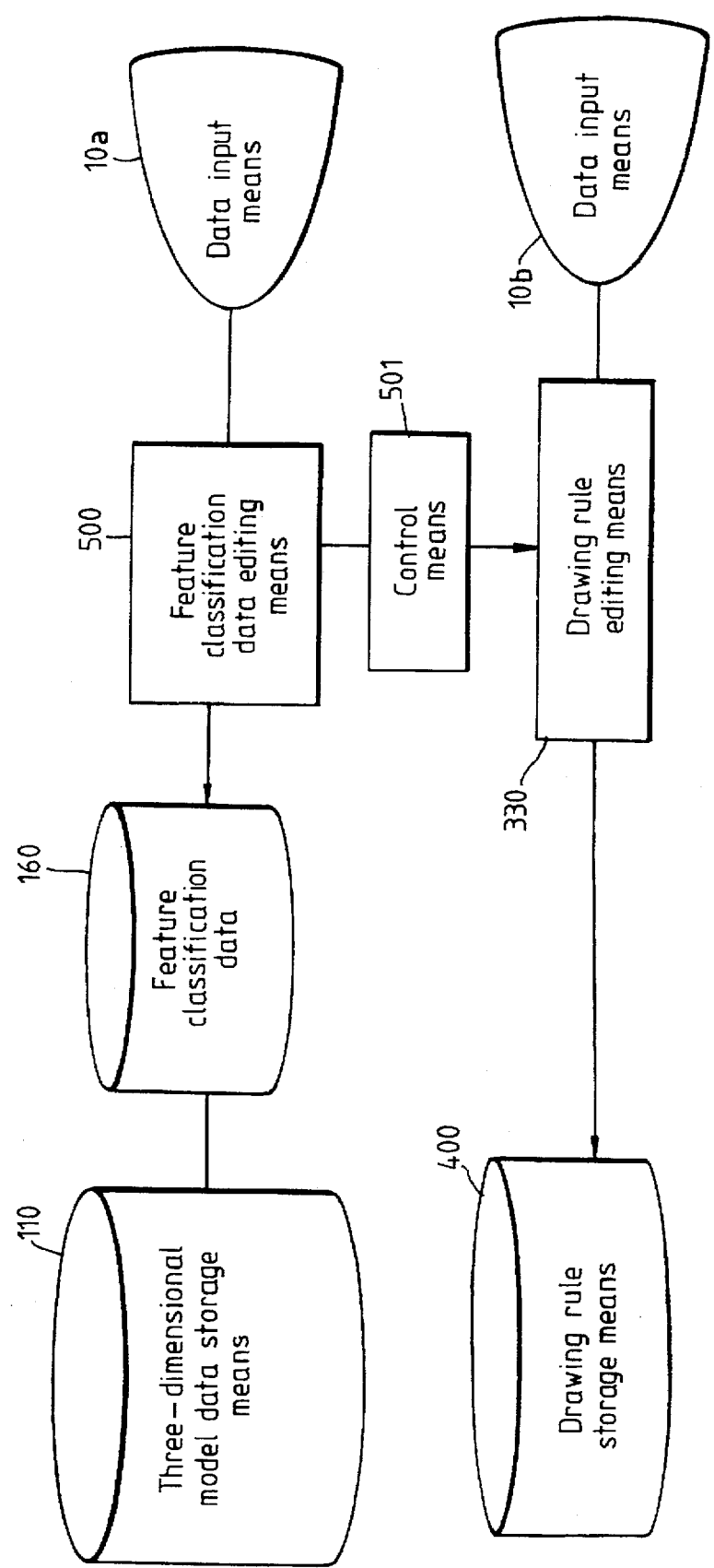
FIG. 22 is a block diagram showing the configuration of part of a another embodiment of the present invention.

FIG. 22 shows the configuration of part of another embodiment of an object drawing preparing apparatus according to the present invention. This embodiment is similar to the first embodiment and corresponding features are indicated by the same reference numerals. However, this embodiment has a feature classification data editing means 500 and a control means 501 for controlling the drawing rule editing means 330. In this embodiment, additional feature classification data may be added to the feature classification data 100 by operating an input means 10a linked to the feature classification editing means 500. Then, information is transferred to the drawing rule editing means 330 and a prompt for requesting the user to edit the drawing rules is displayed on a data input means 10b. Similarly, when feature classification data is deleted from the feature classification data 100 by operating the feature classification data editing means 500 using the data input means 10a, information is transferred to the drawing rule editing means 330 and the drawing rule editing means 330 may then delete the drawing rule corresponding to the relevant feature which is stored in the drawing rule storage means 400.

Figure 23A:
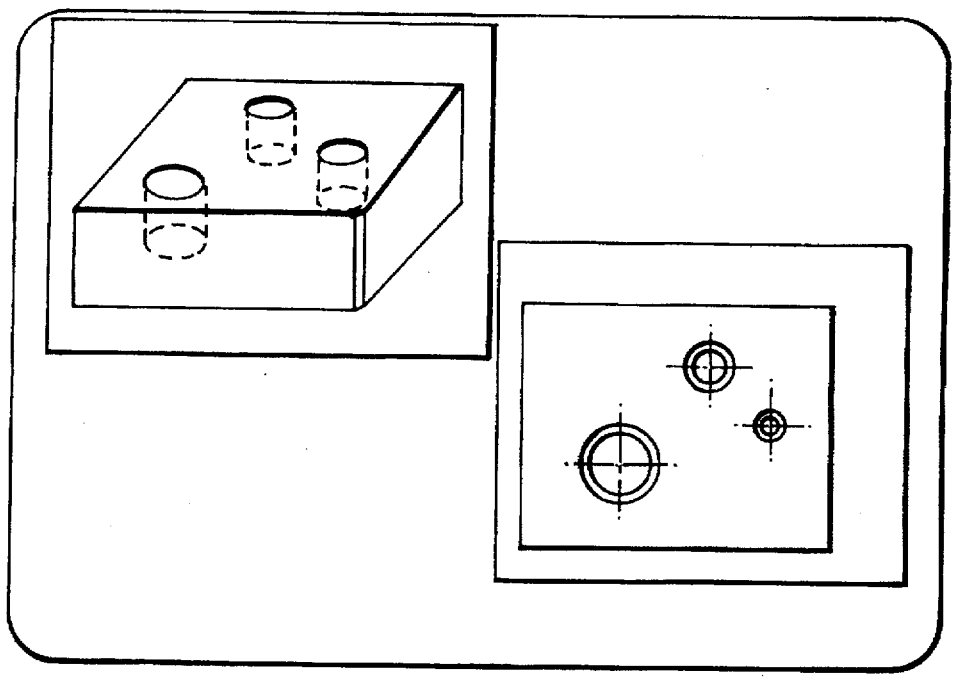
FIGS. 23(a) to 23(e) show another example of screens which may be produced by the embodiment of FIG. 22.
Figure 23B:
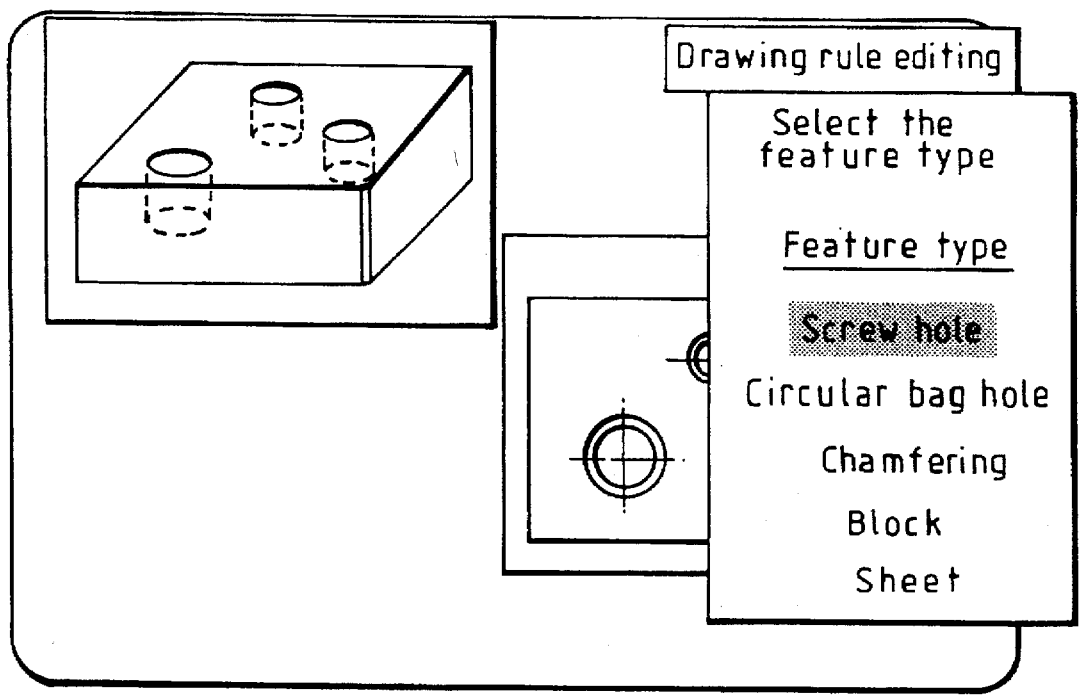
Figure 23C:
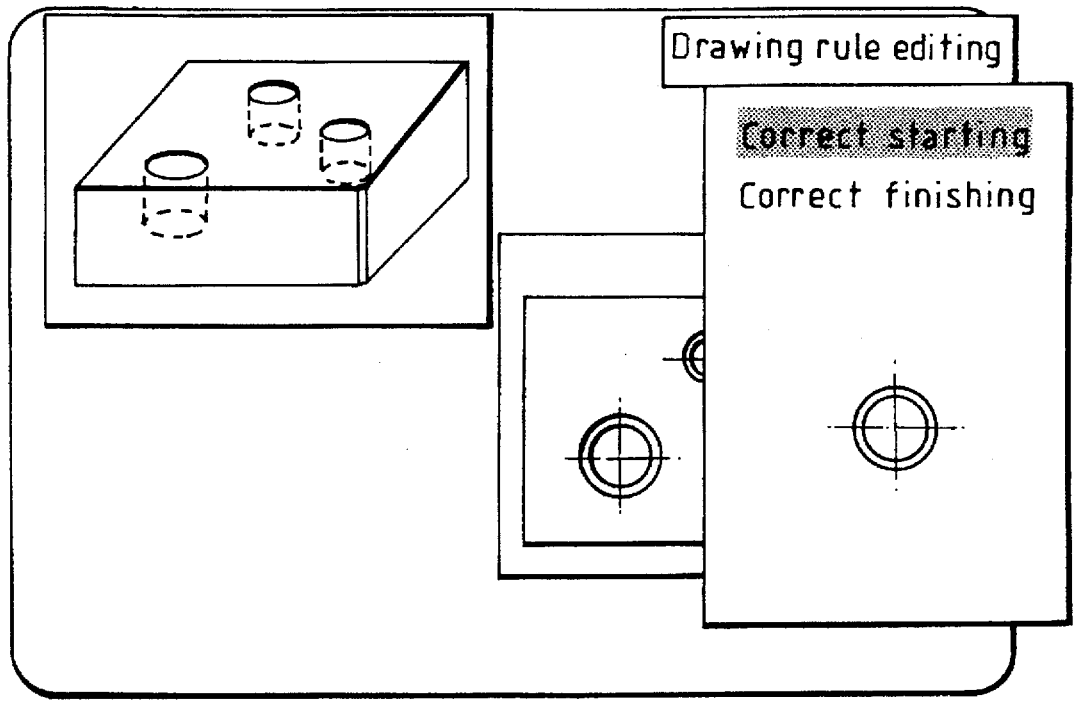
Figure 23D:
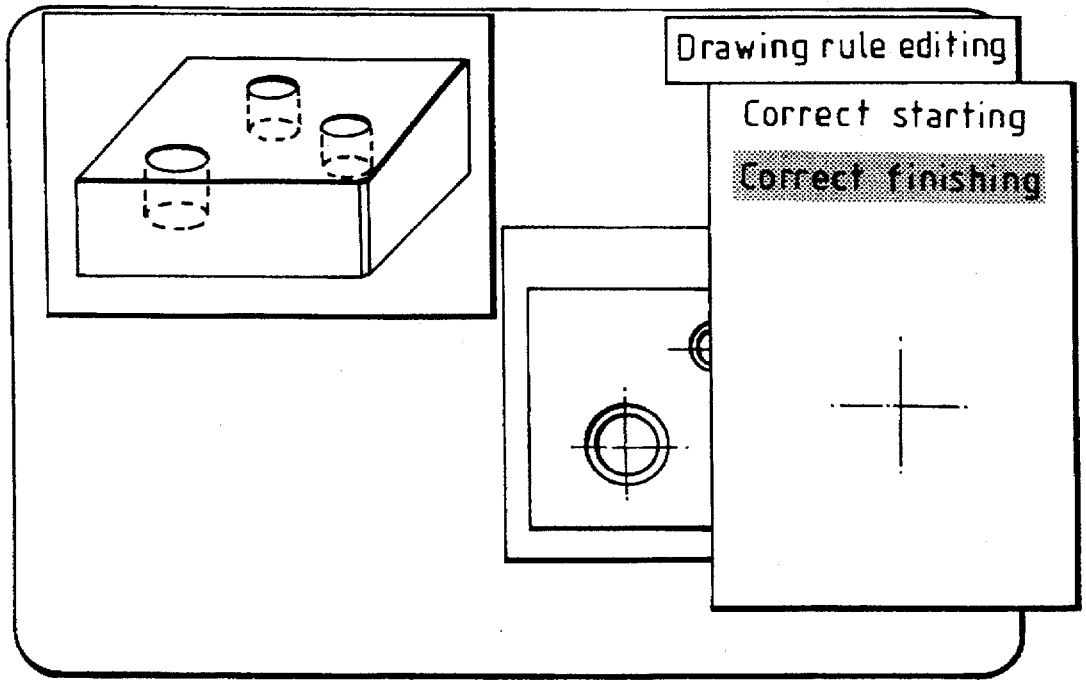
Figure 23E:
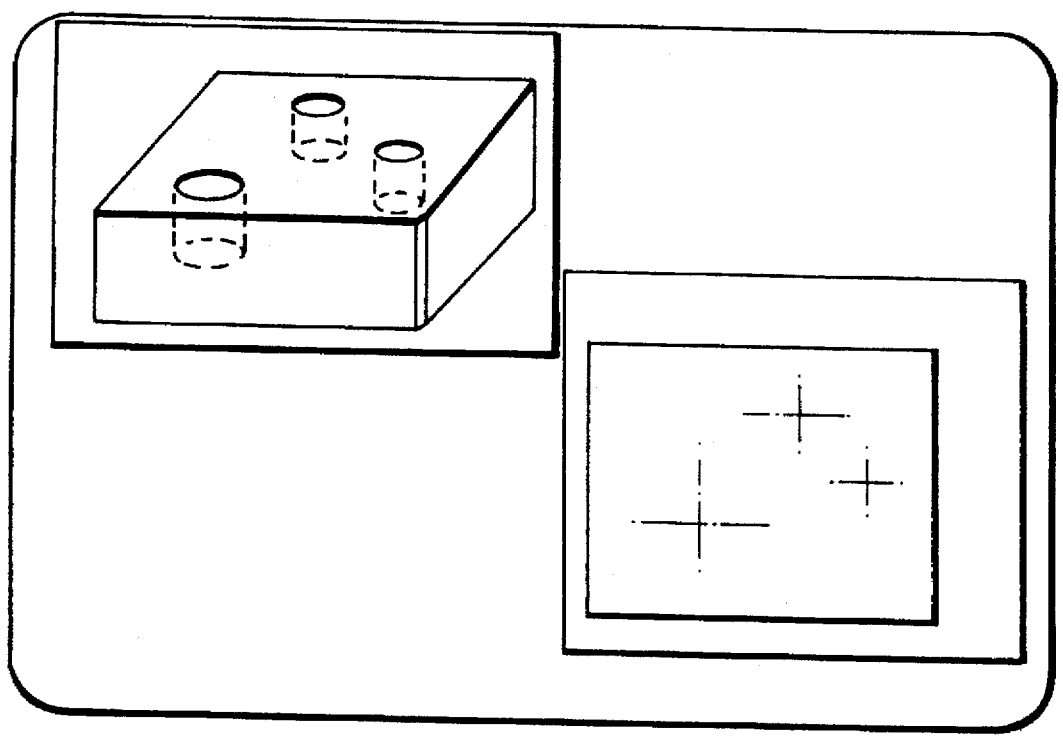

FIGS. 23(a) to 23(e) shown an example of the operation of the embodiment of FIG. 22. It is assumed that the image shown in FIG. 23(a) is generated initially. A "Drawing Rule Editing" command is selected by the user, as shown in FIG. 23(b). Then, the user is requested to select a feature for which the drawing rule is to be changed as shown in FIG. 23(b). When the relevant feature is selected, a graphic image which is obtained by carrying out the drawing rule for the feature is displayed on the two-dimensional data output means 100 as shown in FIG. 23(c). When the user changes the graphic image as shown in FIG. 23(d), the changing procedure is also stored as a drawing rule. As a result, the drawing of "screw hole" is changed as shown in FIG. 23(e).

FIG. 24 shows an embodiment in which there are a plurality of I/O units 600, each having two-dimensional data output means and drawing use setting means. Again, components of this embodiment which correspond to the embodiment of FIG. 1 are indicated by the same reference numerals. The I/O units 600a to 600c are connected to each other via a communication means 700a to 700c and a network 800, and also are connected to a common data storage and execution unit 801. Assuming that the I/O unit 600a is located in a design section, the I/O unit 600b is located in a machining section, and the I/O unit 600c is located in another design section, each section accesses a product model storage means 170 having drawing rule storage means 400, drawing rule selection means 310, and drawing rule execution means 320 via the network 800. Therefore, each design section can output a design drawing and the machining section can output a machining drawing for a product model.

According to the present invention, a two-dimensional image of an object can be obtained from a three-dimensional model. A plurality of images can be obtained automatically from a three-dimensional model according to the intended use to which the image is to be put.

What is claimed is:

1. A method of generating an image of a feature of an object, comprising the steps of:

providing model data representing a three-dimensional image of said object, said model data including feature classification data representing at least one feature of said object;

storing a plurality of drawing rules for said at least one feature, each of said plurality of drawing rules corresponding to a two-dimensional representation of said at least one feature from one of a plurality of viewing directions, and each of said plurality of drawing rules for said at least one feature representing a different predetermined visual presentation of said at least one feature according to a different standard drawing convention;

selecting one of said plurality of viewing directions for said object;

selecting, in response to feature classification data and the selected viewing direction, one of said plurality of drawing rules for said at least one feature corresponding to a particular visual presentation of said at least one feature so as to display said at least one feature according to the standard drawing convention corresponding to the selected one of said plurality of drawing rules; and generating a two-dimensional image of said at least one feature of said object from said model data and said selected one of said plurality of drawing rules, whereby said at least one feature is shown in said two-dimensional image with said particular visual presentation.

2. A method according to claim 1, wherein at least some of said drawing rules have at least one variable parameter, and said step of selecting said one of said drawing rules includes selecting a value of said at least one variable parameter.

3. A method according to claim 2, wherein said selecting of said value of said at least one parameter is carried out using said model data.

4. A method according to claim 1, wherein said plurality of drawing rules are arranged in a plurality of groups of drawing rules, each of said plurality of groups relating to a different visual presentation of said at least one feature.

5. A method according to claim 4, further including the step of selecting one of said plurality of groups whereby said at least one feature is shown in said two-dimensional image with said predetermined visual presentation corresponding to the selected one of said plurality of groups.

6. A method according to claim 1, including the step of editing said plurality of drawing rules.

7. A method according to claim 1, including the step of editing said feature data and automatically editing said plurality of drawing rules in dependence upon said editing of said feature data.

8. A method of generating an image of a feature of an object, comprising the steps of:

providing model data representing a three-dimensional image of said object, said model data including feature classification data representing at least one feature of said object;

storing a plurality of drawing rules for said at least one feature, each of said plurality of drawing rules corresponding to a two-dimensional representation of said at least one feature from one of a plurality of viewing directions, and each of said plurality of drawing rules for said at least one feature representing a different predetermined visual presentation of said at least one feature according to a different standard drawing convention;

selecting one of said plurality of viewing directions for said object;

selecting, in response to feature classification data and the selected viewing direction, one of said plurality of drawing rules for said at least one feature corresponding to a particular visual presentation of said at least one feature so as to display said at least one feature according to the standard drawing convention corresponding to the selected one of said plurality of drawing rules;

generating a two-dimensional image of said at least one feature of said model data corresponding to said selected one of said plurality of viewing directions and said selected one of said plurality of drawing rules, whereby said at least one feature is shown with said particular visual presentation;

selecting a part of said at least one feature of said object from said image;

selecting, in response to the selected viewing direction, another of said plurality of drawing rules for said selected part of said at least one feature corresponding to another visual presentation of said at least one feature so as to display said at least one feature according to the standard drawing convention corresponding to the selected one of said plurality of drawing rules; and generating a further two-dimensional image of said at least one feature from said model data and said another of said plurality of drawing rules, whereby said at least one feature is shown in said two-dimensional image with said another visual presentation corresponding to said another of said plurality of drawing rules.

9. An apparatus for generating an image of a feature of an object, comprising:

means for providing a model data representing a three-dimensional image of said object, said model data including feature classification data representing at least one feature of said object;

means for storing a plurality of drawing rules for said at least one feature, each of said plurality of drawing rules corresponding to a two-dimensional representation of said at least one feature from one of a plurality of viewing directions, and each of said plurality of drawing rules for said at least one feature representing a different predetermined visual presentation of said at least one feature according to a different standard drawing convention;

means for selecting one of said viewing directions for said object;

means, responsive to feature classification data and the selected viewing direction, for selecting one of said drawing rules for said at least one feature corresponding to a particular visual presentation of said at least one feature so as to display said at least one feature according to the standard drawing convention corresponding to the selected one of said plurality of drawing rules; and means for generating a two-dimensional image of said at least one feature of said object from said model data and said selected one of said plurality of drawing rules.

10. An apparatus according to claim 9, further including means for selecting one group from a plurality of groups of said drawing rules, and wherein said means for generating said two-dimensional image operates according to the drawing rules of the selected one group of said plurality of groups.

11. An apparatus according to claim 9, further including means for editing said plurality of drawing rules.

12. An apparatus according to claim 9, further including means for editing said feature data and means for automatically editing said plurality of drawing rules in dependence upon said means for editing said feature data.

13. An apparatus for generating an image of a feature of an object, comprising:

means for providing a model data representing a three-dimensional image of said object, said model data including feature classification data representing at least one feature of said object;

means for storing a plurality of drawing rules for said at least one feature, each of said plurality of drawing rules corresponding to a two-dimensional representation of said at least one feature from one of a plurality of viewing directions, and each of said plurality of drawing rules for said at least one feature representing a different predetermined visual presentation of said at least one feature according to a different standard drawing convention;

means for selecting one of said plurality of viewing directions for said object and selecting one of said plurality of drawing rules, responsive to feature classification data and the selected viewing direction, for said at least one feature corresponding to a particular visual presentation of said at least one feature so as to display said at least one feature according to the standard drawing convention corresponding to the selected one of said plurality of drawing rules;

generating means for generating a two-dimensional image of said at least one feature of said object from said model data and said selected one of said plurality of drawing rules corresponding to said selected one of said plurality of viewing directions;

means for selecting a part of said at least one feature of said object from said two-dimensional image; and means for selecting, in response to the selected viewing directions, another one of said plurality of drawing rules for said at least one feature corresponding to another visual presentation of said at least one feature so as to display said at least one feature according to the standard drawing convention corresponding to the selected one of said plurality of drawing rules;

wherein said generating means is arranged to generate a further two-dimensional image of said at least one feature from said model data and said selected another one of said plurality of drawing rules.

14. A system for generating a plurality of images of features of an object, comprising a plurality of input/output units for use independently by a plurality of users, at least one common storage unit, and communication means connecting said plurality of input/output units to said at least one common storage unit;

wherein said at least one common storage unit comprises means for providing model data representing a three-dimensional image of said object, said model data including feature classification data representing at least one feature of said object;

means for storing a plurality of drawing rules for said at least one feature, each of said plurality of drawing rules corresponding to a two-dimensional representation of said at least one feature from one of a plurality of viewing directions, and each of said plurality of drawing rules for said at least one feature representing a different predetermined visual presentation of said at least one feature according to a different standard drawing convention; and each of said plurality of input/output units comprise means for selecting one of said viewing directions for said object, means responsive to feature classification data and the selected viewing direction, for selecting of said drawing rules for said at least one feature corresponding to a particular visual presentation so as to display said at least one feature according to the standard drawing convention corresponding to the selected one of said plurality of drawing rules, and means for generating a two-dimensional image of said at least one feature of said object from said model data and said selected one of said plurality of drawing rules;

whereby different two dimensional images of said feature of said object are displayable on said generating means of respective ones of said plurality of input/output units in dependence on said means for selecting one of said viewing directions and said means for selecting one of said drawing rules of said respective ones of said plurality of input/output units.

15. A method according to claim 1, further including the step of selecting a particular visual presentation for said at least one feature, said one of said plurality of drawing rules being selected at least in accordance with a selected particular visual presentation.

16. A method according to claim 8, further including the step of selecting a particular visual presentation and said another visual presentation, said one of said plurality of drawing rules being selected at least in accordance with a selected particular visual presentation and said another of said plurality drawing rules being selected at least in accordance with a selected another visual presentation.

17. An apparatus according to claim 9, further including means for selecting a particular visual presentation for said at least one feature, said one of said plurality of drawing rules being selected at least in accordance with a selected particular visual presentation.

* * * * *